US008595146B1

(12) United States Patent
Liew

(10) Patent No.: US 8,595,146 B1
(45) Date of Patent: Nov. 26, 2013

(54) SOCIAL NETWORKING PERMISSIONS

(75) Inventor: Jeremy Liew, Washington, DC (US)

(73) Assignee: AOL Inc., Dulles, VA (US)

(*) Notice: Subject to any disclaimer, the term of this patent is extended or adjusted under 35 U.S.C. 154(b) by 2536 days.

(21) Appl. No.: 11/079,524

(22) Filed: Mar. 15, 2005

Related U.S. Application Data

(63) Continuation-in-part of application No. 10/981,460, filed on Nov. 5, 2004.

(60) Provisional application No. 60/552,718, filed on Mar. 15, 2004, provisional application No. 60/579,290, filed on Jun. 15, 2004.

(51) Int. Cl.
*G06Q 99/00* (2006.01)

(52) U.S. Cl.
USPC .......................................................... 705/319

(58) Field of Classification Search
USPC ........................................................ 705/1, 319
See application file for complete search history.

(56) References Cited

U.S. PATENT DOCUMENTS

| | | | |
|---|---|---|---|
| 4,837,798 A | 6/1989 | Cohen et al. | |
| 5,086,394 A | 2/1992 | Shapira | |
| 5,276,905 A | 1/1994 | Hurst et al. | |
| 5,327,486 A | 7/1994 | Wolff et al. | |
| 5,533,110 A | 7/1996 | Pinard et al. | |
| 5,548,637 A | 8/1996 | Heller et al. | |
| 5,557,659 A | 9/1996 | Hyde-Thomson | |
| 5,583,920 A | 12/1996 | Wheeler, Jr. | |
| 5,608,786 A | 3/1997 | Gordon | |
| 5,610,910 A | 3/1997 | Focsaneanu et al. | |
| 5,650,994 A | 7/1997 | Daley | |
| 5,694,523 A | 12/1997 | Wical | |
| 5,694,616 A | 12/1997 | Johnson et al. | |

(Continued)

FOREIGN PATENT DOCUMENTS

| EP | 0 827 063 A | 3/1998 |
|---|---|---|
| EP | 0 862 304 A2 | 9/1998 |

(Continued)

OTHER PUBLICATIONS

"A Countermeasure to Duplicate-detecting Anti-spam Techniques," Robert J. Hall, AT&T Labs—Technical Report 99.9.1, 1999, Abst. and pp. 1-26.

(Continued)

*Primary Examiner* — Gabrielle McCormick
*Assistant Examiner* — Shaun Sensenig
(74) *Attorney, Agent, or Firm* — Finnegan, Henderson, Farabow, Garrett & Dunner LLP

(57) ABSTRACT

Enabling access to user-specific content includes maintaining data indicating a social network that indicates a first user and a second user that are connected by one or more relationships through zero or more intermediary users. At least one of the relationships that connect the first and second users is categorized. A request for access to content maintained by the second user is received from the first user. One or more of the relationships that connect the first user to the second user are identified using the data indicating the social network. A category of at least one of the identified relationships is identified. A type of access to the content to be provided to the first user is identified based on the identified category. The first user is enabled to access the content in accordance with the identified type of access.

22 Claims, 12 Drawing Sheets

(56) References Cited

U.S. PATENT DOCUMENTS

| | | |
|---|---|---|
| 5,721,906 A | 2/1998 | Siefert |
| 5,742,905 A | 4/1998 | Pepe et al. |
| 5,764,916 A | 6/1998 | Busey et al. |
| 5,774,670 A | 6/1998 | Montulli |
| 5,790,800 A | 8/1998 | Gauvin et al. |
| 5,793,365 A | 8/1998 | Tang et al. |
| 5,802,470 A | 9/1998 | Gaulke |
| 5,826,261 A | 10/1998 | Spencer |
| 5,835,724 A | 11/1998 | Smith |
| 5,848,134 A | 12/1998 | Sekiguchi et al. |
| 5,850,594 A | 12/1998 | Cannon et al. |
| 5,859,979 A | 1/1999 | Tung et al. |
| 5,867,162 A | 2/1999 | O'Leary et al. |
| 5,870,744 A | 2/1999 | Sprague |
| 5,872,521 A | 2/1999 | Lopatukin et al. |
| 5,877,759 A | 3/1999 | Bauer |
| 5,878,219 A | 3/1999 | Vance, Jr. et al. |
| 5,893,091 A | 4/1999 | Hunt et al. |
| 5,893,099 A | 4/1999 | Schreiber et al. |
| 5,895,465 A | 4/1999 | Guha |
| 5,913,214 A | 6/1999 | Madnick et al. |
| 5,919,247 A | 7/1999 | Van Hoff et al. |
| 5,920,692 A | 7/1999 | Nguyen et al. |
| 5,924,090 A | 7/1999 | Krellenstein |
| 5,933,827 A | 8/1999 | Cole et al. |
| 5,940,488 A | 8/1999 | DeGrazia et al. |
| 5,940,821 A | 8/1999 | Wical |
| 5,946,617 A | 8/1999 | Portaro et al. |
| 5,948,058 A | 9/1999 | Kudoh et al. |
| 5,951,643 A | 9/1999 | Shelton et al. |
| 5,951,646 A | 9/1999 | Brandon |
| 5,951,652 A | 9/1999 | Ingrassia, Jr. et al. |
| 5,953,716 A | 9/1999 | Madnick et al. |
| 5,954,798 A | 9/1999 | Shelton et al. |
| 5,956,716 A | 9/1999 | Kenner et al. |
| 5,960,173 A | 9/1999 | Tang et al. |
| 5,983,214 A | 11/1999 | Lang et al. |
| 5,983,369 A | 11/1999 | Bakoglu et al. |
| 5,987,113 A | 11/1999 | James |
| 5,987,407 A | 11/1999 | Wu et al. |
| 5,987,446 A | 11/1999 | Corey et al. |
| 5,991,756 A | 11/1999 | Wu |
| 5,991,791 A | 11/1999 | Siefert |
| 5,995,023 A | 11/1999 | Kreft |
| 6,002,402 A | 12/1999 | Schacher |
| 6,006,179 A | 12/1999 | Wu et al. |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,029,172 A | 2/2000 | Jorna et al. |
| 6,038,610 A | 3/2000 | Belfiore et al. |
| 6,049,533 A | 4/2000 | Norman et al. |
| 6,055,540 A | 4/2000 | Snow et al. |
| 6,055,572 A | 4/2000 | Saksena |
| 6,065,047 A | 5/2000 | Carpenter et al. |
| 6,070,171 A | 5/2000 | Snyder et al. |
| 6,073,138 A | 6/2000 | de l'Etraz et al. |
| 6,078,866 A | 6/2000 | Buck et al. |
| 6,078,914 A | 6/2000 | Redfern |
| 6,078,924 A | 6/2000 | Ainsbury et al. |
| 6,081,805 A | 6/2000 | Guha |
| 6,081,830 A | 6/2000 | Schindler |
| 6,085,223 A | 7/2000 | Carino, Jr. et al. |
| 6,088,435 A | 7/2000 | Barber et al. |
| 6,094,657 A | 7/2000 | Hailpern et al. |
| 6,098,066 A | 8/2000 | Snow et al. |
| 6,098,620 A | 8/2000 | Lloyd et al. |
| 6,108,651 A | 8/2000 | Guha |
| 6,112,181 A * | 8/2000 | Shear et al. ............ 705/1 |
| 6,112,201 A | 8/2000 | Wical |
| 6,112,227 A | 8/2000 | Heiner |
| 6,122,740 A | 9/2000 | Andersen |
| 6,125,353 A | 9/2000 | Yagasaki |
| 6,134,432 A | 10/2000 | Holmes et al. |
| 6,144,991 A | 11/2000 | England |
| 6,151,584 A | 11/2000 | Papierniak et al. |
| 6,161,130 A | 12/2000 | Horvitz et al. |
| 6,166,730 A | 12/2000 | Goode et al. |
| 6,175,830 B1 | 1/2001 | Maynard |
| 6,175,831 B1 | 1/2001 | Weinreich et al. |
| 6,182,068 B1 | 1/2001 | Cullis |
| 6,182,081 B1 | 1/2001 | Dietl et al. |
| 6,185,550 B1 | 2/2001 | Snow et al. |
| 6,192,395 B1 | 2/2001 | Berner et al. |
| 6,195,354 B1 | 2/2001 | Skalecki et al. |
| 6,199,102 B1 | 3/2001 | Cobb |
| 6,199,103 B1 | 3/2001 | Sakaguchi et al. |
| 6,212,548 B1 | 4/2001 | DeSimone et al. |
| 6,212,550 B1 | 4/2001 | Segur |
| 6,223,213 B1 | 4/2001 | Cleron et al. |
| 6,233,577 B1 | 5/2001 | Ramasubramani et al. |
| 6,247,043 B1 | 6/2001 | Bates et al. |
| 6,249,740 B1 | 6/2001 | Ito et al. |
| 6,249,743 B1 | 6/2001 | Ohshimo |
| 6,260,148 B1 | 7/2001 | Aggarwal et al. |
| 6,266,664 B1 | 7/2001 | Russell-Falla et al. |
| 6,269,369 B1 | 7/2001 | Robertson |
| 6,275,820 B1 | 8/2001 | Navin-Chandra et al. |
| 6,278,993 B1 | 8/2001 | Kumar et al. |
| 6,301,609 B1 | 10/2001 | Aravamudan et al. |
| 6,311,211 B1 | 10/2001 | Shaw et al. |
| 6,314,450 B1 | 11/2001 | Hachiya et al. |
| 6,317,776 B1 | 11/2001 | Broussard et al. |
| 6,321,224 B1 | 11/2001 | Beall et al. |
| 6,321,228 B1 | 11/2001 | Crandall et al. |
| 6,324,541 B1 | 11/2001 | de l'Etraz et al. |
| 6,327,590 B1 | 12/2001 | Chidlovskii et al. |
| 6,330,590 B1 | 12/2001 | Cotten |
| 6,336,117 B1 | 1/2002 | Massarani |
| 6,347,332 B1 | 2/2002 | Malet et al. |
| 6,351,698 B1 | 2/2002 | Kubota et al. |
| 6,356,899 B1 | 3/2002 | Chakrabarti et al. |
| 6,363,392 B1 | 3/2002 | Halstead et al. |
| 6,370,527 B1 | 4/2002 | Singhal |
| 6,374,246 B1 | 4/2002 | Matsuo |
| 6,374,290 B1 | 4/2002 | Scharber et al. |
| 6,381,599 B1 | 4/2002 | Jones et al. |
| 6,381,637 B1 | 4/2002 | Kamada |
| 6,385,602 B1 | 5/2002 | Tso et al. |
| 6,389,127 B1 | 5/2002 | Vardi et al. |
| 6,389,372 B1 | 5/2002 | Glance et al. |
| 6,393,464 B1 | 5/2002 | Bieterman |
| 6,400,381 B1 | 6/2002 | Barrett et al. |
| 6,405,035 B1 | 6/2002 | Singh |
| 6,405,249 B1 | 6/2002 | Matsuda et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,344 B1 | 8/2002 | Dixon et al. |
| 6,430,604 B1 | 8/2002 | Ogle et al. |
| 6,442,549 B1 | 8/2002 | Schneider |
| 6,446,112 B1 | 9/2002 | Bunney et al. |
| 6,449,344 B1 | 9/2002 | Goldfinger et al. |
| 6,449,634 B1 | 9/2002 | Capiel |
| 6,456,998 B1 | 9/2002 | Bui et al. |
| 6,460,034 B1 | 10/2002 | Wical |
| 6,463,430 B1 | 10/2002 | Brady et al. |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,529,475 B1 | 3/2003 | Wan et al. |
| 6,535,586 B1 | 3/2003 | Cloutier et al. |
| 6,539,375 B2 | 3/2003 | Kawasaki |
| 6,539,421 B1 | 3/2003 | Appleman et al. |
| 6,549,937 B1 | 4/2003 | Auerbach et al. |
| 6,557,027 B1 | 4/2003 | Cragun |
| 6,559,863 B1 | 5/2003 | Megiddo |
| 6,560,600 B1 | 5/2003 | Broder |

(56) References Cited

U.S. PATENT DOCUMENTS

| | | |
|---|---|---|
| 6,564,248 B1 | 5/2003 | Budge et al. |
| 6,564,261 B1 | 5/2003 | Gudjonsson et al. |
| 6,571,234 B1 | 5/2003 | Knight et al. |
| 6,574,599 B1 | 6/2003 | Lim et al. |
| 6,574,632 B2 | 6/2003 | Fox et al. |
| 6,580,790 B1 | 6/2003 | Henry et al. |
| 6,601,061 B1 | 7/2003 | Holt et al. |
| 6,606,620 B1 | 8/2003 | Sundaresan et al. |
| 6,606,647 B2 | 8/2003 | Shah et al. |
| 6,615,241 B1 | 9/2003 | Miller et al. |
| 6,615,248 B1 | 9/2003 | Smith |
| 6,636,733 B1 | 10/2003 | Helferich |
| 6,640,223 B1 | 10/2003 | Jones et al. |
| 6,640,230 B1 | 10/2003 | Alexander et al. |
| 6,643,641 B1 | 11/2003 | Snyder |
| 6,654,683 B2 | 11/2003 | Jin et al. |
| 6,677,968 B1 | 1/2004 | Appelman |
| 6,677,976 B2 | 1/2004 | Parker et al. |
| 6,678,719 B1 | 1/2004 | Stimmel |
| 6,691,162 B1 | 2/2004 | Wick |
| 6,697,807 B2 | 2/2004 | McGeachie |
| 6,701,310 B1 | 3/2004 | Sugiura et al. |
| 6,701,318 B2 | 3/2004 | Fox et al. |
| 6,701,348 B2 | 3/2004 | Sommerer |
| 6,704,728 B1 | 3/2004 | Chang et al. |
| 6,704,729 B1 | 3/2004 | Klein et al. |
| 6,714,791 B2 | 3/2004 | Friedman |
| 6,714,793 B1 | 3/2004 | Carey et al. |
| 6,718,365 B1 | 4/2004 | Dutta |
| 6,721,741 B1 | 4/2004 | Eyal et al. |
| 6,731,308 B1 | 5/2004 | Tang et al. |
| 6,732,155 B2 | 5/2004 | Meek |
| 6,738,822 B2 | 5/2004 | Fukasawa et al. |
| 6,745,227 B1 | 6/2004 | Bates et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,757,365 B1 | 6/2004 | Bogard |
| 6,757,732 B1 | 6/2004 | Sollee et al. |
| 6,772,188 B1 | 8/2004 | Cloutier |
| 6,781,608 B1 | 8/2004 | Crawford |
| 6,785,554 B1 | 8/2004 | Amerga |
| 6,785,671 B1 | 8/2004 | Bailey et al. |
| 6,785,681 B2 | 8/2004 | Keskar et al. |
| 6,785,781 B2 | 8/2004 | Leenstra et al. |
| 6,788,769 B1 | 9/2004 | Waites |
| 6,795,863 B1 | 9/2004 | Doty, Jr. |
| 6,799,039 B2 | 9/2004 | Wu et al. |
| 6,800,031 B2 | 10/2004 | Di Cesare |
| 6,807,574 B1 | 10/2004 | Partovi et al. |
| 6,832,245 B1 | 12/2004 | Isaacs et al. |
| 6,832,263 B2 | 12/2004 | Polizzi et al. |
| 6,839,737 B1 | 1/2005 | Friskel |
| 6,857,006 B1 | 2/2005 | Nishizawa |
| 6,859,807 B1 | 2/2005 | Knight et al. |
| 6,876,997 B1 | 4/2005 | Rorex et al. |
| 6,879,665 B1 | 4/2005 | Cook et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,920,478 B2 | 7/2005 | Mendiola et al. |
| 6,938,021 B2 | 8/2005 | Shear et al. |
| 6,941,345 B1 | 9/2005 | Kapil et al. |
| 6,968,179 B1 | 11/2005 | De Vries |
| 6,993,564 B2 | 1/2006 | Whitten, II |
| 6,996,520 B2 | 2/2006 | Levin |
| 6,999,959 B2 | 2/2006 | Lawrence et al. |
| 7,007,008 B2 | 2/2006 | Goel et al. |
| 7,035,865 B2 | 4/2006 | Doss et al. |
| 7,039,639 B2 | 5/2006 | Brezin et al. |
| 7,039,676 B1 | 5/2006 | Day et al. |
| 7,043,530 B2 | 5/2006 | Isaacs et al. |
| 7,047,229 B2 | 5/2006 | Goel |
| 7,058,036 B1 | 6/2006 | Yu et al. |
| 7,058,690 B2 | 6/2006 | Maehiro |
| 7,065,186 B1 | 6/2006 | Myers et al. |
| 7,082,047 B2 | 7/2006 | Chow |
| 7,082,407 B1 | 7/2006 | Bezos et al. |
| 7,120,687 B1 | 10/2006 | Tessman, Jr. |
| 7,124,123 B1 | 10/2006 | Roskind et al. |
| 7,127,232 B2 | 10/2006 | O'Neil et al. |
| 7,139,797 B1 | 11/2006 | Yoakum et al. |
| 7,171,473 B1 | 1/2007 | Eftis et al. |
| 7,177,880 B2 | 2/2007 | Ruvolo et al. |
| 7,181,498 B2 | 2/2007 | Zhu et al. |
| 7,185,059 B2 | 2/2007 | Daniell et al. |
| 7,188,153 B2 | 3/2007 | Lunt et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,225,180 B2 | 5/2007 | Donaldson et al. |
| 7,233,992 B1 | 6/2007 | Muldoon et al. |
| 7,269,590 B2 | 9/2007 | Hull et al. |
| 7,275,215 B2 | 9/2007 | Werndorfer |
| 7,313,760 B2 | 12/2007 | Grossman et al. |
| 7,436,780 B2 | 10/2008 | Stephens et al. |
| 7,437,413 B2 | 10/2008 | Okuyama et al. |
| 7,512,652 B1 | 3/2009 | Appelman |
| 7,716,287 B2 | 5/2010 | Appelman |
| 7,765,484 B2 | 7/2010 | Roskind |
| 7,774,711 B2 | 8/2010 | Valeski |
| 7,945,674 B2 | 5/2011 | Appelman |
| 2001/0003828 A1 | 6/2001 | Peterson et al. |
| 2001/0005861 A1 | 6/2001 | Mousseau et al. |
| 2001/0013050 A1 | 8/2001 | Shah |
| 2001/0054041 A1 | 12/2001 | Chang |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0056123 A1 | 5/2002 | Liwerant et al. |
| 2002/0059201 A1 | 5/2002 | Work |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0103786 A1 | 8/2002 | Goel |
| 2002/0103788 A1 | 8/2002 | Donaldson et al. |
| 2002/0103801 A1 | 8/2002 | Lysons |
| 2002/0112181 A1* | 8/2002 | Smith .................... 713/201 |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0065721 A1 | 4/2003 | Roskind |
| 2003/0084103 A1 | 5/2003 | Weiner et al. |

(56) References Cited

U.S. PATENT DOCUMENTS

| | | |
|---|---|---|
| 2003/0093580 A1 | 5/2003 | Thomas et al. |
| 2003/0101226 A1 | 5/2003 | Quine |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0177111 A1 | 9/2003 | Egendorf et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0054729 A1 | 3/2004 | Fukuizumi et al. |
| 2004/0054736 A1 | 3/2004 | Daniell et al. |
| 2004/0056901 A1 | 3/2004 | March et al. |
| 2004/0117443 A1 | 6/2004 | Barsness |
| 2004/0122681 A1 | 6/2004 | Ruvolo et al. |
| 2004/0122810 A1 | 6/2004 | Mayer |
| 2004/0122855 A1 | 6/2004 | Ruvolo et al. |
| 2004/0128356 A1 | 7/2004 | Bernstein et al. |
| 2004/0177015 A1 | 9/2004 | Galai et al. |
| 2004/0179039 A1 | 9/2004 | Blattner et al. |
| 2004/0186738 A1 | 9/2004 | Reisman |
| 2004/0201624 A1 | 10/2004 | Crawford |
| 2004/0210844 A1 | 10/2004 | Pettinati et al. |
| 2004/0215648 A1 | 10/2004 | Marshall et al. |
| 2004/0215721 A1 | 10/2004 | Szeto et al. |
| 2004/0215793 A1 | 10/2004 | Ryan et al. |
| 2004/0260762 A1 | 12/2004 | Fish |
| 2005/0015432 A1 | 1/2005 | Cohen |
| 2005/0021750 A1* | 1/2005 | Abrams ................. 709/225 |
| 2005/0027382 A1 | 2/2005 | Kirmse et al. |
| 2005/0038688 A1 | 2/2005 | Collins et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Guster et al. |
| 2005/0055416 A1 | 3/2005 | Heikes et al. |
| 2005/0060377 A1 | 3/2005 | Lo et al. |
| 2005/0076240 A1 | 4/2005 | Appelman |
| 2005/0076241 A1 | 4/2005 | Appelman |
| 2005/0080859 A1 | 4/2005 | Lake |
| 2005/0080863 A1 | 4/2005 | Daniell |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0154913 A1 | 7/2005 | Barriga et al. |
| 2005/0197846 A1 | 9/2005 | Pezaris et al. |
| 2005/0198031 A1* | 9/2005 | Pezaris et al. .............. 707/9 |
| 2005/0198131 A1 | 9/2005 | Appelman |
| 2005/0198172 A1 | 9/2005 | Appelman |
| 2005/0198173 A1 | 9/2005 | Evans |
| 2005/0246420 A1 | 11/2005 | Little |
| 2005/0267766 A1* | 12/2005 | Galbreath et al. .......... 705/1 |
| 2006/0031772 A1 | 2/2006 | Valeski |
| 2006/0075044 A1 | 4/2006 | Fox et al. |
| 2006/0149719 A1 | 7/2006 | Harris |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0248573 A1 | 11/2006 | Pannu et al. |
| 2006/0277187 A1 | 12/2006 | Roese et al. |
| 2007/0156664 A1 | 7/2007 | Norton et al. |
| 2008/0082620 A1 | 4/2008 | Barsness |
| 2008/0228598 A1 | 9/2008 | Leff et al. |
| 2008/0255989 A1 | 10/2008 | Altberg et al. |
| 2009/0043844 A1 | 2/2009 | Zimmet et al. |
| 2009/0089316 A1 | 4/2009 | Kogan et al. |

FOREIGN PATENT DOCUMENTS

| | | |
|---|---|---|
| EP | 0 918 295 A | 5/1999 |
| EP | 0 945 811 A | 9/1999 |
| EP | 1 045 547 A | 10/2000 |
| EP | 1 176 840 A1 | 1/2002 |
| EP | 1 487 169 A2 | 12/2004 |
| GB | 2319137 | 5/1998 |
| GB | 2357932 | 7/2001 |
| GB | 2 368 747 A | 5/2002 |
| GB | 2368747 | 5/2002 |
| JP | 8-314826 | 11/1996 |
| JP | 2000-049901 | 2/2000 |
| JP | 2000-259514 | 9/2000 |
| JP | 2000-284999 | 10/2000 |
| JP | 2000357176 | 12/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/39286 | 8/1999 |
| WO | WO 99/48011 | 9/1999 |
| WO | WO 00/16201 | 3/2000 |
| WO | WO 00/24154 | 4/2000 |
| WO | WO00/26762 | 5/2000 |
| WO | WO00/58894 | 10/2000 |
| WO | WO 00/60809 | 10/2000 |
| WO | 00/79396 | 12/2000 |
| WO | WO 01/16806 | 3/2001 |
| WO | WO 01/22258 A2 | 3/2001 |
| WO | WO 01/24036 | 4/2001 |
| WO | WO 01/27720 | 4/2001 |
| WO | WO 01/43357 | 5/2001 |
| WO | 01/67787 | 9/2001 |
| WO | WO 01/72020 | 9/2001 |
| WO | WO 01/80079 | 10/2001 |
| WO | 02/03216 | 1/2002 |
| WO | WO 02/09437 | 1/2002 |
| WO | WO 02/35781 | 5/2002 |
| WO | WO 02/062039 | 8/2002 |
| WO | WO 02/073886 A1 | 9/2002 |
| WO | 01/06748 | 1/2004 |
| WO | WO 2004/028178 | 4/2004 |
| WO | WO 2005/086723 | 9/2005 |
| WO | WO 2005/089286 | 9/2005 |
| WO | WO 2006/068955 | 6/2006 |

OTHER PUBLICATIONS

"A Reputation System for Peer-to-Peer Networks," Gupta et al., Jun. 1-3, 2003, NOSSDAV'03, Monterey, California, pp. 144-152.

"Announce: Implementation of E-mail Spam Proposal," Maurice L. Marvin, news.admin.net-abuse.misc, Aug. 3, 1996, 2 pages.

"BestCalls.com Announces the BestCalls Technology Index," Business Wire, Jun. 30, 1999, Business Wire, p. 1.

"Better Bayesian Filtering," Paul Graham, Jan. 2003, pp. 1-11, http://www.paulgraham.com/better.html.

"Business at Cyberspeed; Brainstorm Becomes Quick Internet Hit," Walker, Jan. 24, 1999, The Washington Post, p. A.01 (4 total pages).

"CrushParty.com: Help," retrieved Jun. 12, 2002 from the World Wide Web: http://www.crushparty.com/help.jsp, 3 pages.

"Degrees of Separation Email Spam Protection," Halfbakery: Degrees of Separation Email Spam Protection, reprinted from http://halfbakery.com/idea/Degrees_20of_20Separation_20Email_20Spam_20Protecti . . . printed on Mar. 1, 2004 (3 pages).

"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages.

"Finding Others Online: Reputation Systems for Social Online Spaces," Jensen et al., Apr. 20-25, 2002, CHI, Minneapolis, Minnesota, vol. 4, Issue 1, pp. 447-454.

(56) References Cited

OTHER PUBLICATIONS

"Hottie or Nottie? Web Site Voters Let You Know Whether You Sizzle or Fizzle," Marino, Jul. 11, 2001, Florida Times Union, p. C.1. (2 total pages).
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 ..., printed on Nov. 5,2004 (3 pages).
"Instant Messaging for Gamers," PC Gamer, May 2004, vol. 11, No. 5, p. 28.
"Learning Spam: Simple Techniques for Freely-Available Software," Bart Massey et al, Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anlx.net/piespy printed on Mar. 11, 2004 (18 pages).
"Plaxo," Plaxo, reprinted from http://web.archive.org/web/20041105072256/http://www.plaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Reflections on Friendster, Trust and Intimacy," Danah Boyd. *Ubicomp 2003*, Workshop Application for the Intimate Ubiquitous Computing Workshop. Seattle, WA, Oct. 12-15, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging, retrieved Apr. 29, 2004 from the World Wide Web: http://www.rimrod.com/software/rim1/Webmessenger-RIM-J2ME-Instant-Messaging-20...," pp. 1-4.
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Nets Find Friends in VCs," Joanna Glasner, http://www.wired.com/news , Nov. 17, 2003, pp. 1-3.
"Social Network Fragments: An Interactive Tool for Exploring Digital Social Connections." Danah Boyd, Jeff Potter. Sketch at *SIG-GRAPH 2003*. San Diego, California: ACM, Jul. 27-31, 2003.
"Social Networking for Business: Release 0.5," Esther Dyson, Esther Dyson's Monthly Report, vol. 21, No. 10, Nov. 25, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, pp. 55ff.
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.
"SVM-based Filtering of E-mail Spam with Content-specific Misclassification Costs," Aleksander Kolcz et al., *TextDM'2001 (IEEE ICDM-2001 Workshop on Text Mining)*, San Jose, CA, 2001, pp. 1-14.
"SWF Seeks Attractive Head Shot; to Stand Out, Online Daters Pay for Professional Photos; Cropping out the Ex-Wife," Leiber, Nov. 19, 2003, The Wall Street Journal, p. D.1.
"Technical Solutions for Controlling Spam," Shane Hird, Proceedings of AUUG2002, Melbourne, Sep. 4-6, 2002, 17 pages.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000.
"Telstra targets Net spammers," J. Dudley, news.com.au, Dec. 2, 2003, 2 pages.
"Text Categorization with Support Vector Machines: Learning with Many Relevant Features," Thorsten Joachims, University of Dortmund, Computer Science Dept., LS-8 Report 23, 1998, 18 pages.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity.com/default.php?intemationa . . .printed on Nov. 5, 2004 (available on Feb. 2, 2003) (1 page).
"Will You Buy a Car From This Man?," Leander Kahney, Oct. 6, 2003, pp. 1-3.
America Online Inc., "AOL Instant Messenger", Aug. 29, 2000, Internet: www.aol.com/aim/, (18 pages).
America Online Inc., New AIM 4.7, Sep. 27, 2001, Internet: http://aim.aol.com, (7 pages).
CNET Networks Inc., "PopUp Killer", Sep. 13, 2001, Internet: download.cnet.com/downloads/0-10059-100-6932612.html, (3 pages).
International Search Report and Written Opinion dated Feb. 15, 2006 for International Application No. PCT/US05/07204.
International Search Report issued in Application Serial No. PCT/US05/08476, dated Oct. 16, 2006, 9 pages.
International Search Report issued in International Application No. EP03731244, dated Aug. 30, 2005, (4 pages).
Office Action issued in U.S. Appl. No. 10/146,814, dated Jul. 2, 2007, 15 pages.
Office Action issued in U.S. Appl. No, 10/146,814, dated Dec. 11, 2006, 15 pages.
Office Action issued in U.S. Appl. No. 10/184,002, dated Jan. 9, 2007, 11 pages.
Office Action issued in U.S. Appl. No. 10/334,056, dated Nov. 5, 2007 (21 pages).
Office Action issued in U.S. Appl. No. 10/334,056, dated May 21, 2007, (7 pages).
Office Action issued in U.S. Appl. No. 10/334,056, dated May 10, 2006, (7 pages).
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/633,636, dated Oct. 11, 2006, 9 pages.
Office Action issued in U.S. Appl. No. 11/017,204, dated Dec. 12, 2007, 13 pages.

(56) References Cited

OTHER PUBLICATIONS

Office Action issued in U.S. Appl. No. 11/015,424, dated Mar. 19, 2008, 43 pages.
Ed Bott and Ron Person, Using Windows 95 with Internet Explorer 4.0, Feb. 17, 1998, Que, Special Edition, 21 pages.
Home-tribe.net, http://washingtondc.tribe.net/message/24434d1b-817b-4580-aa42-3bffa15f26a?page=1 (4 total pages).
http://www.friendster.com (17 pages).
McKendrick, Joseph; "Internet Call Centers: New Era in Customer Service"; Feb. 2002; V10, n2, pp. 22(4).
Ryze home page, www.ryze.com, Dec. 21, 2003, available at http://web.archive.org/web/20031221010006/http://ryze.com, printed Mar. 16, 2005, 13 pages.
VisiblePath webpages, www.visiblepath.org, Dec. 3, 2003, available at http://web.archive.org/web/20031203132211/http://www.visiblepath.com, printed Mar. 16, 2005, 5 pages.
WebmasterWorld.com Inc., "HTML and Browsers", Mar. 5, 2001, Internet: www.webmaster.com/forum21/367.htm, 2 pages.
ZeroDegrees home page, www-zerodegrees.com, Jan. 24, 2004, available at http://web.archive.org/web/20040204153037/www.zerodegrees.com/home.htm, printed Mar. 16, 2005, 2 pages.
Office Action issued in U.S. Appl. No. 10/334,056, dated May 12, 2008, 22 pages.
Office Action issued in U.S. Appl. No. 11/017,204, dated Jun. 23, 2008, 33 pages.
Office Action issued in U.S. Appl. No. 10/981,460, dated Aug. 20, 2008, 24 pages.
Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.
R. Movva & W. Lai, "MSN Messenger Service 1.0 Protocol", Aug. 1999, Internet Draft, http://tools.ietf.org/id/draft-movva-msn-messenger-protocol-oo.txt, 28 pages.
Neo Mai, Ken Neo. "Buying and selling on the internet; [Computimes, 2* Edition]." New Straits Times. Kuala Lumpur: Jun. 28, 2001. p. 53.
Reichard, K., "AOL, ICQ to Interoperate—But in a Limited Fashion," Oct. 30, 2002, InstantMessagingPlanet, available at www.instantmessagingplanet.com/public/article.php/1490771.
"About Internet directory services," Help File, Outlook 2000 SR-1 (9.0.0. 4527), Aug. 10, 2001 (1 page).
"Active Directory Features," retrieved from http://www.microsoft.com/windows2000/server/evaluation/features/adlist.asp, Jun. 15, 1999 (4 pages).
"Active Directory Service Overview," retrieved from http://www.microsoft.com/windows2000/server/evaluation/business/ad-datasheet.asp, Nov. 30, 2001 (5 pages).
"Active Directory," retrieved from http://www.microsoft.com/windows2000/technologies/directory/AD/default.asp, May 13, 2002 (13 pages).
"AOL Instant Messenger All New Version 2.0," Jun. 24, 2009 (2 pages).
"AOL technology: turning complicated things into engaging services," 1996 Annual Report (22 pages).
"Benefits of Active Directory in a Windows 2000 Environment," retrieved from http://www.microsoft.com/windows2000/server/evaluation/business/adwin2k (9 pages).
"Directory Integration Can Lower Total Cost of Ownership and Increase Application Functionality," retrieved from http://www.microsoft.com/presspas/press/1998/July98/ActivDPR.asp, Jul. 27, 1998, (4 pages).
"Enterprise Identity Management with Windows 2000 and Active Directory," retrieved from http://www.microsoft.com/technet/prodtechnol/ad/windows2000/evaluate/w2keims.asp, 1999 (16 pages).
"Frequently Asked Questions About AOL Instant Messenger," Jun. 24, 1999, 6 pages.
"Integrating Applications with Windows 2000 and Active Directory," retrieved from http:/www.microsoft.com/technet/prodtechnol/ad/windows2000/evaluate/adappstrasp, Oct. 2000, (12 pages).
"Integrating Microsoft Metadirectory Services and Active Directory," retrieved from retrieved http://www.microsoft.com/windows2000/server/evaluation/news/bulletins/mmsma.asp, Aug. 31, 2000 (1 page).
"The Gordano Messaging Server," retrieved from http://www.gordano.com (3 pages).
"Look up contact information from an item," Help File, Outlook 2000 SR-1 (9.0.0 4527), Aug. 10, 2001, (1 page).
"New Features in AOL Instant Messenger for Windows v. 2.01 Beta," Apr. 28, 1999 (2 pages).
"Part II: Tasks and Procedures," Active Directory Operations Guide, Microsoft Corporation, Microsoft Windows 2000, Version 1.5, Dec. 5, 2002, pp. 1-131.
"AOL Instant Messenger All New Version 2.0 Quick Tips for Getting Started," Jun. 24, 1999 (5 pages).
"Set up LDAP directory services," Help File, Outlook 2000 SR-1 (9.0.0 4527), Aug. 10, 2001 (1 page).
"The LP Wireless Messenger," Messenger Documentation, retrieved from http://www.lpwireless.com/messengerhelp.htm, Nov. 2, 2002 (7 pages).
Stank, "Using Active Directory Service," Microsoft Windows 2000 Administrator's Pocket Consultant, 1999, pp. 1-6.
"What is AOL Instant Messenger," Jun. 24, 1999 (3 pages).
"What's new about exchanging information over the Internet," Outlook 2000 SR-1 (9.0.0.4527) (1 page).
"Windows 2000 Directory Services," retrieved from http://www.microsoft.com/windows2000/technologies/directory/default.asp, Nov. 25, 2001 (1 page).
"Yahoo! Messenger Makes the World a Little Smaller, More Informed," Jun. 21, 1999 (2 pages).
Cohen, "Instant Messaging," PC Magazine, Apr. 13, 1999 (2 pages).
Cannon, "Design Guide for Directory-Enabled Applications," retrieved from http://msdn.microsoft.com/library/en-us/dnactdir/html/deal.asp?frame=true, Apr. 2001, pp. 1-18.
Kohda et al., "IMPP: A New Instant Messaging Standard and Its Impact on Internet Business," Fujitsu Sci. Tech. J., vol. 36, No. 2, Dec. 2000, pp. 147-153.
McKendrick, "Internet Call Centers: New Era in Customer Service," vol. 10, No. 2, Feb. 2002 (5 pages).
Microsoft Corporation, "Active Directory Services Interface in the Microsoft Exchange 5.5 Environment," retrieved from http://msdn.microsoft.com/library/en-us/dnactdir/html/msdn_adsiexch.asp?frame=true, Nov. 1997, pp. 1-12.
Microsoft Corporation, "Comparing Microsoft Active Directory to Novell's NDS," retrieved from http://msdn.microsoft.com/library/en-us/dnactdir/html/msdn_activedirvsnds.asp?frame=true, Sep. 1998, pp. 1-17.
Microsoft Corporation, "Introduction to Active Directory Application Mode," Microsoft Windows Server 2003, Aug. 2002, pp. 1-13.
Microsoft Corporation, "Using ADSI, LDAP, and Network Management Functions With Active Directory," retrieved from http://msdn.microsoft.com/library/en-us/dnactdir/html/BuildingADApps.asp?frame=true, Sep. 1998, pp. 1-9.
"Part I: Active Directory Operations," Active Directory Operations Guide, Microsoft Corporation, Microsoft Windows 2000, Version 1.5, Dec. 5, 2002, pp. 1-187.
Stank, "Working with Active Directory Domains," Microsoft Windows 2000 Administrator's Pocket Consultant, Chapter 5, 1999, pp. 1-10.
International Search Report for International Application No. PCT/US03/15715, dated Aug. 14, 2003 (6 pages).
Advisory Action issued in U.S. Appl. No. 10/146,814, dated Jul. 10, 2008 (3 pages).
Advisory Action issued in U.S. Appl. No. 10/633,636, dated Sep. 18, 2007 (3 pages).
Advisory Action issued in U.S. Appl. No. 11/015,476, dated Apr. 9, 2010 (3 pages).
Advisory Action issued in U.S. Appl. No. 11/015,476, dated Feb. 1, 2010 (6 pages).

(56) References Cited

OTHER PUBLICATIONS

Advisory Action issued in U.S. Appl. No. 11/079,522, dated May 25, 2010 (4 pages).
"About File Transfers," Help Documentation, AOL Instant Messenger, Version 4.3, Jul. 21, 2001, (5 pages).
"Push To Talk™ Services," retrieved from http://www.nextel.com/services/directconnect/ptt_overview.shtml, Dec. 29, 2003 (1 page).
"The Internet—the Advent of New Forms of Communication," retrieved from http://journal.fujitsu.com/248e/e48now.html, Dec. 29, 2003 (4 pages).
"AOL Instant Messenger," retrieved from http://web.archive.org/web/20010721193059/http://aim.com, Aug. 26, 2005 (7 pages).
"AOL Instant Messenger," Jul. 21, 2001 (7 pages).
Morpheus 1.9.1 download page, retrieved on Oct. 8, 2001 (2 pages).
MusicCity Morpheus download page, retrieved from cjnet Download.com on Feb. 14, 2007 (2 pages).
Office Action issued in Australian Patent Application No. 2002340039, dated Apr. 7, 2006 (2 pages).
BuddyGopher: About, retrieved from http://web.archive.org/web/20040713002836/http://www.buddygopher.com, Sep. 28, 2005 (4 pages).
BuddyGopher: We Love Away Messages!, "BuddyGopher simultaneously checks the away messages of your favorite AIM buddies," retrieved from http://web.archive.org/web/20040924104001/http://www.buddygopher.com, Sep. 28, 2005 (2 pages).
Office Action issued in Canadian Patent Application No. 2,462,037, dated Feb. 12, 2009 (4 pages).
Office Action issued in Chinese Patent Application No. 02821420X, dated Jul. 7, 2006, (5 pages).
Supplementary European Search Report issued in European Application No. 05 72 8303, dated Jan. 9, 2009, 2 pages.
Courter et al., "Mastering Microsoft Outlook 2000 Premium Edition," Sybex Inc., Alameda, California, 2000, pp. 167-169.
Decision on Appeal issued in U.S. Appl. No. 10/146,814, dated Mar. 22, 2010 (13 pages).
Dodgeball.com: mobile social software, "help: text messaging," available on Oct. 13, 2004, retrieved from http://web.archive.org/web/20041013034241_/www.dodgeball.com/social/help_text.php on Sep. 28, 2005 (3 pages).
Dodgeball.com: mobile social software, "help: the basics," available on Oct. 9, 2004, retrieved from http://web.archive.org/web/20041009200739/www.dodgeball.com/social/help_basics.php, Sep. 28, 2005 (2 pagws.)
Dodgeball.com: mobile social software, "help: use it," retrieved from http://web.archive.ora/web/20041009201853/www.dodgeball.com/social/help_useit.php on Sep. 28, 2005 (2 pages).
Dodgeball.com: mobile social software, "Hook up with friends. Discover what's around you," retrieved from http://web.archive.org/web/20041130034344/www.dodgeball.com/social/index.php on Sep. 28, 2005 (2 pages).
Dutta-Roy, "Virtual Meetings with Desktop Conferencing," IEEE Spectrum, vol. 35, No. 7, Jul. 1, 1998, pp. 47-56, and 66.
Eschenburg, "Wo laufen sie denn?," Oct. 26, 1998, pp. 92-95.
International Search Report in International Patent Application No. PCT/US 01/07319, issued by the European Patent Office (2 pages).
European Application No. 02778374.5-1238, Communication of Aug. 31, 2009, issued by European Patent Office (8 pages).
European Application No. 02778374.5-1238, Communication of Sep. 5, 2006, issued by European Patent Office (3 pages).
Examiner's Answer issued in U.S. Appl. No. 10/146,814, dated Jan. 12, 2009 (19 pages).
Decision on Appeal issued in U.S. Appl. No. 10/633,636, dated Feb. 1, 2010 (10 pages).
Examiner's Answer issued in U.S. Appl. No. 10/633,636, dated Apr. 17, 2008 (11 pages).
Examiner's Answer issued in U.S. Appl. No. 11/015,476, dated Aug. 5, 2010 (16 pages).
Examiner's Answer issued in U.S. Appl. No. 11/079,522, dated Aug. 31, 2010 (12 pages).
Final Office Action issued in U.S. Appl. No. 10/633,636, dated Nov. 9, 2010 (11 pages).
Final Office Action issued in U.S. Appl. No. 10/633,636, dated Jun. 20, 2007 (10 pages).
Final Office Action issued in U.S. Appl. No. 11/015,424, dated Nov. 3, 2008 (46 pages).
Final Office Action issued in U.S. Appl. No. 11/015,424, of Oct. 19, 2009 (59 pages).
Final Office Action issued in U.S. Appl. No. 11/079,522, dated Feb. 18, 2010 (11 pages).
Final Office Action issued in U.S. Appl. No. 11/237,718, dated Oct. 30, 2009 (21 pages).
Final Office Action issued in U.S. Appl. No. 12/336,880, dated Mar. 2, 2011 (23 pages).
Final Office Action issued in U.S. Appl. No. 11/464,816, dated Sep. 16, 2011 (24 pages).
"GLWebMail 2.0 is released," retrieved from http://web.archive.org/web/20010418153714//http://www.gordano.com (2 pages).
Hartenstein, et al., "xhtalk 2.9," Nov. 1992 (6 pages).
Hearsy, "Support Vector Machines," IEEE Intelligent Systems, Jul./Aug. 1998, pp. 18-28.
IBM, "Configuring Sametime Servers in Your Domino Environment," May 1, 2000 (14 pages).
International Application No. PCT/US00/35160, International Search Report dated Apr. 11, 2003 (3 pages).
International Application No. PCT/US02/30730, International Search Report dated Jan. 9, 2003 (5 pages).
Isaacs, "Example UI Spec: Sound Instant Messages," retrieved from http://www.uidesigns.com/spec/d-sims.html on Jun. 26, 2003 (2 pages).
Jensen, et al., "Finding Others Online: Reputation Systems for Social Online Spaces," Apr. 20-25, 2002, CHI, Minneapolis, Minnesota, vol. 4, Issue 1, pp. 447-454.
Kohda et al., "IMPP: A new Instant Messaging Standard and Its Impact on Internet Business," Dec. 2000, Fujitsu Sci. Tech. J., 36, 2, pp. 147-153.
Lotus Sametime 1.5 1999 (4 pages).
Mariano, "Morpheus 1.9 to be unleashed," Jun. 10, 2002 (6 pages).
Marklein, "Students have 'away' with words," Mar. 28, 2004, USA Today, http://www.usatoday.com/tech/news/2004-03-28-aways-messages-usat_x.htm, 4 pages.
Matsumoto, et al., "Chocoa Communicator—A New Communication System Based on Awareness and Text Communications," Fujitsu Sci. Tech. J., 36, 2, pp. 154-161, Dec. 2000.
Muller, "Dial 1-800-Internet," Feb. 1996, pp. 83-84, 86, and 88.
Wingfield, "Changing Chat—Instant Messaging is Taking Off, and For Some Users It's Nuzzling Out the Phone," Asian WSJ, Sep. 2000, (5 pages).
Notice of Allowance issued in U.S. Appl. No. 10/146,814, dated Jan. 20, 2011, (7 pages).
Notice of Allowance issued in U.S. Appl. No. 10/146,814, dated Oct. 1, 2010, (7 pages).
Notice of Allowance issued in U.S. App. No. 10/184,002, dated Jul. 24, 2008, (16 pages).
Notice of Allowance issued in U.S. Appl. No. 11/015,424, dated Feb. 17, 2010 (13 pages).
Notice of Allowance issued in U.S. Appl. No. 11/237,718, dated Apr. 2, 2010 (6 pages).
Notice of Allowance issued in U.S. Appl. No. 10/134,437, dated Oct. 2, 2009 (6 pages).
Final Office Action issued in U.S. Appl. No. 09/843,788, dated Apr. 19, 2007 (17 pages).
Office Action issued in U.S. Appl. No. 10/134,437, dated Feb. 11, 2008 (34 pages).
Final Office Action issued in U.S. Appl. No. 10/134,437, dated May 18, 2006 (26 pages).
Final Office Action issued in U.S. Appl. No. 10/134,437 dated Sep. 18, 2008 (32 pages).
Advisory Action issued in U.S. Appl. No. 10/134,437, dated Aug. 21, 2006 (3 pages).
Office Action issued in U.S. Appl. No. 10/134,437, dated Mar. 10, 2009 (31 pages).

(56) References Cited

OTHER PUBLICATIONS

Office Action issued in U.S. Appl. No. 10/134,437, dated Nov. 1, 2005 (21 pages).
Notice of Non-Compliant Appeal Brief issued in U.S. Appl. No. 10/134,437, dated Sep. 6, 2007 (2 pages).
Office Action issued in U.S. Appl. No. 10/134,437, dated Sep. 18, 2008 (30 pages).
Office Action issued in U.S. Appl. No. 10/146,814, dated Sep. 20, 2005 (10 pages).
Office Action issued in U.S. Appl. No. 10/146,814, dated May 22, 2006 (11 pages).
Advisory Action issued in U.S. Appl. No. 10/146,814, dated Feb. 21, 2007 (3 pages).
Final Office Action issued in U.S. Appl. No. 10/146,814, dated Apr. 15, 2008 (20 pages).
Final Office Action issued in U.S. Appl. No. 10/746,232, dated Oct. 30, 2009 (13 pages).
Notice of Allowance issued in U.S. Appl. No. 10/746,232, dated Jan. 18, 2011 (9 pages).
Final Office Action issued in U.S. Appl. No. 10/746,230, dated Oct. 5, 2009, (9 pages).
Advisory Action issued in U.S. Appl. No. 10/746,230, dated Feb. 18, 2010, (2 pages).
Notice of Allowance issued in U.S. Appl. No. 10/746,230, dated Apr. 9, 2010, (6 pages).
Notice of Allowance issued in U.S. Appl. No. 10/746,230, dated Jan. 6, 2011, (5 pages).
Office Action issued in U.S. Appl. No. 11/464,816, dated Nov. 24, 2009, (16 pages).
Final Office Action issued in U.S. Appl. No. 11/464,816, dated Jun. 8, 2010, (23 pages).
Office Action issued in U.S. Appl. No. 11/464,816, dated Mar. 16, 2011 (22 pages).
Final Office Action issued in U.S. Appl. No. 11/015,423, dated Nov. 19, 2009 (16 pages).
Advisory Action issued in U.S. Appl. No. 11/015,423, dated Mar. 10, 2010 (6 pages).
Examiner's Answer issued in U.S. Appl. No. 11/015,423, dated Sep. 2, 2010 (18 pages).
Office Action issued in U.S. Appl. No. 11/015,423, dated Dec. 9, 2010 (15 pages).
Final Office Action issued in U.S. Appl. No. 11/015,423, dated May 18, 2011 (18 pages).
Office Action issued in U.S. Appl. No. 10/184,002, dated Apr. 20, 2006 (15 pages).
Office Action issued in U.S. Appl. No. 10/184,002, dated Aug. 25, 2005 (13 pages).
Office Action issued in U.S. Appl. No. 10/184,002, dated Jan. 8, 2008 (10 pages).
Office Action issued in U.S. Appl. No. 10/334,056, dated Oct. 30, 2008 (19 pages).
Office Action issued in U.S. Appl. No. 10/633,636, dated May 25, 2010 (10 pages).
Office Action issued in U.S. Appl. No. 11/015,424, dated Mar. 19, 2008 (31 pages).
Final Office Action issued in U.S. Appl. No. 11/015,476, dated Sep. 8, 2009 (14 pages).
Office Action issued in U.S. Appl. No. 11/017,204, dated Jun. 23, 2008 (33 pages).
Office Action issued in U.S. Appl. No. 11/079,522, dated Sep. 1, 2009 (8 pages).
Office Action issued in U.S. Appl. No. 12/336,880, dated Aug. 4, 2010 (12 pages).
PowWow, Mar. 1, 2000, "Introduction," retrieved on Apr. 3, 2006 from http://web.archive.org/web/20000301125635/ww2.tribal.com/help/online_docs/h205voic.html (2 pages).
Pruitt, "IDG News Service: Morpheus Updates Peer-to-Peer Client," Jun. 10, 2002, retrieved on Feb. 14, 2007 from URL:http://www.pcworld.com/article/id.101736/article.html (3 pages).

Ranganalhan et al., "ConChat: A Context-Aware Chat Program," 2002, Pervasive Computing, pp. 51-57.
Satter, excerpts from Internet TV with CU-SeeMe, First Edition, including Title Page and Copyright Page; "Overview;" "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; Sams.net Publishing, Indianapolis, IN.
Snider, "America goes online for New Year's bash," USA Today, Jan. 2, 2000, 1 page.
Stanek, Microsoft Windows 2000 Administrator's Pocket Consultant, Microsoft Corporation, 1999, retrieved from http://www.microsoft.-com/technet/prodtechnol/ad/windows2000/evaluate/05w2kada.asp on May 8, 2003, pp. 1-6.
Stanek, Microsoft Windows 2000 Administrator's Pocket Consultant, Microsoft Corporation, 1999, retrieved from http://www.microsoft.com/technet/prodtechnol/ad/windows2000/evaluate/05vv2kadb.asp? n May 8, 2003, pp. 1-10.
Transcript of Oral Proceedings, held Dec. 9, 2009, for U.S. Appl. No. 10/633,636 (14 pages).
Transcript of Oral Proceedings, held Mar. 10, 2010, for U.S. Appl. No. 10/146,814 (16 pages).
Tribal Voice, PowWow Guided Tour—Step 6, PowWow personal communication. http://web.archive.org/web/2000817094516/www.tribal.com/powwow/tour/step6.cfm, Oct. 22, 1999 (2 pages).
Viegas et al., "Digital Artifacts for Remembering and Storytelling: PostHistory and Social Network Fragments," retrieved from http://web.media.mitedu/~fviegas/papers/posthistory_snf.pdf (10 pages).
"Windows NetMeeting—Features," retrieved from http://www.microsoft.com/windows/NetMeeting/Features/default.ASP on Jun. 17, 1999 (8 pages).
Wayner, "Hey Baby, Call Me at My IP Address," Apr. 1996, pp. 142-144.
WBWE (1998), PowWow 3.6 Brings the Power of Internet Community to the People, Business Wire, (2 pages).
Yoshino, et al., "Namba: Location-Aware Collaboration System for Shopping and Meeting," Aug. 2002, IEEE Transactions on Consumer Electronics, pp. 470-477.
Wang et al., "Video: An empirical study of realvideo performance across the internet," Proceedings of the 1st ACM SIGCOMM Workshop on Internet Measurement IMW'01. Nov. 2001. ACM Press (15 pages).
U.S. Appl. No. 10/146,814 to Appleman for "Providing Supplemental Contact Information Corresponding to a Referenced Individual," filed May 17, 2002 (57 pages).
U.S. Appl. No. 10/334,056 for "Notification of Contact List Membership and Statistics," filed Dec. 31, 2002.
U.S. Appl. No. 10/633,636 to Appelman for "Intelligently enabled menu choices based on online presence state in address book," filed Aug. 5, 2003.
Pending U.S. Appl. No. 11/017,204.
U.S. Appl. No. 11/464,816 to Wick for "Popularity Index," filed Aug. 15, 2006.
International Search Report for PCT/US01/24077 dated Aug. 3, 2004, 11 pages.
"Development and Operation of the Next-Generation Rating/Filtering System on the Internet," retrieved from http://www.nmda.or.jp/enc/ratina2nd-en.html, Octobner 30, 2002.
A. Chowdhury et al., *IIT TREC-9 Entity Based Feedback with Fusion*. Paper presented at the 9th Annual Text Retrieval Conference (TREC-9), National Institute of Standards and Technology, Gaithersburg, MD (Nov. 13-16, 2000).
Allison L. Powell etal., *The Impact of Database Selection on Distributed Searching*, SIGIR-2000, Athens, Greece (Jul. 2000).
Brian T. Bartell et al., *Automatic Combination of Multiple Ranked Retrieval Systems*. Paper presented at the 17th Annual ACM Conference on Research and Development in Information Retrieval (SIGIR-1994).

(56) References Cited

OTHER PUBLICATIONS

Christoph Baumgarten, *A Probabilistic Solution to the Selection and Fusion Problem in Distributed Information Retrieval*, SIGIR-1999, Berkley, CA (Aug. 1999).
Christopher C. Vogt et al., *Fusion Via a Linear Combination of Scores*. Information Retrieval, vol. 1, 151-173 (1999).
Christopher C. Vogt et al., *Predicting the Performance of Linearly Combined IR Systems*. Paper presented at the 21st Annual ACM Conference on Research and Development in Information Retrieval (SIGIR-1998), Melbourne, Australia (1998).
International Search Report and Written Opinion issued in International Application No. PCT/US05/45663, dated Apr. 11, 2008.
Office Action issued in U.S. Appl. No. 10/746,230, dated Mar. 17, 2009, (13 pages).
Office Action issued in U.S. Appl. No. 10/746,232, dated Mar. 18, 2009, (26 pages).
Office Action issued in U.S. Appl. No. 11/015,423, dated Mar. 2, 2009, (33 pages).
Office Action issued in U.S. Appl. No. 11/015,424, dated May 1, 2009, (47 pages).
Office Action issued in U.S. Appl. No. 11/015,476, dated Mar. 2, 2009, (29 pages).
Office Action issued in U.S. Appl. No. 11/079,522, dated Oct. 16, 2008, (33 pages).
Office Action issued in U.S. Appl. No. 11/079,522, dated Apr. 3, 2009, (14, pages).
Office Action issued in U.S. Appl. No. 11/237,718, dated Apr. 2, 2009, (53 pages).
Office Action issued in U.S. Appl. No. 11/464,816, dated Apr. 21, 2009, (29 pages).
Supplementary European Search Report issued in European Application No. 05857099.5-1238/1836596 PCT/US2005045663, dated Nov. 7, 2008, (5 pages).
Edward A. Fox et al., *Combination of Multiple Searches*. Paper presented at the 2nd Annual Text Retrieval Conference (TREC-2), NIST, Gaithersburg, MD (1994).
Ellen M. Voorhees et al., *Learning Collection Fusion Strategies*. In Proceedings of the 12$^{th}$ Annual Machine Learning Conference, LakeTahoe, CA, 172-179 (Jul. 1995).
Ellen. M. Voorhees et al., *The Collection Fusion Problem*. Paper presented at the 3rd Annual Text Retrieval Conference (TREC-3), NIST, Gaithersburg, MD (1994).
Howard Turtle et al., *Evaluation of an Inference Network-Based Retrieval Model*. ACM Transactions on Information Systems, 9(3), 187-222 (1991).
Ian Leicht, "Re: My spamblock; Was: Thwarting UCE address culling program," retrieved from Internet news.admin.net-abuse.email, Jan. 26, 1997, (2 pages).
J. Katzer et al., *A Study of the Overlap Among Document Representations*, Information Technology: Research and Development, 1(2), 261-274 (1982).
Jim Hu, "AOL developing search engine," CNET.com—News—Entertainment & Media—AOL developing search engine, retrieved from http://news.cnet.com/news/0-1005-200-343860.html, Jun. 21,1999, (3 pages).
Joon Ho Lee, *Analyses of Multiple Evidence Combination*. Paper presented at the 20th Annual ACM Conference on Research and Development in Information Retrieval (SIGIR-1997).
Joon Ho Lee, *Combining Multiple Evidence from Different Properties of Weighting Schemes*. Paper presented at the 18th Annual ACM Conference on Research and Development in Information Retrieval (SIGIR-1995).
Joon Ho Lee, *Combining the Evidence of Different Relevance Feedback Methods for Information Retrieval*. Information Processing and Management, 34(6), 681-691 (1998).
Justin Picard, *Modeling and Combining Evidence Provided by Document Relationships Using Probabilistic Argumentation Systems*. Paper presented at the 21$^{st}$ Annual ACM Conference on Research and Development in Information Retrieval (SIGIR-1998), Melbourne, Australia.
K. L. Kwok et al., *TREC-7 Ad-Hoc, High Precision and Filtering Experiments using PIRCS*. Paper presented at the 7th Annual Text Retrieval Conference (TREC-7), NIST, Gaithersburg, MD (1998).
M. Catherine McCabe et al., *A Unified Environment for Fusion of Information Retrieval Approaches*. Paper presented at the 8th Annual ACM Conference on Information and Knowledge Management (CIKM-1999) (Nov. 1999).
M. McGill et al., "An Evaluation of Factors Affecting Document Ranking by Information Retrieval Systems," retrieved from http://www.nsf.gov/awardsearch/showAward.do?AwardNumber=7810454, Jul. 21, 2005.
N. J. Belkin et al., *Combining the Evidence of Multiple Query Representations for Information Retrieval*. Information Processing & Management, 31(3), 431-448 (1995).
N. J. Belkin et al., *The Effect of Multiple Query Representations on Information Retrieval Performance*. Paper presented at the 16th Annual ACM Conference on Research and Development in Information Retrieval (SIGIR-1993).
Peter W. Foltz et al., *Personalized Information Delivery: An Analysis of Information Filtering Methods*. Communications of the ACM, 35(12) (1992).
Rila Mandela et al., *Combining Multiple Evidence from Different Types of Thesaurus for Query Expansion*, Berkley, CA, SIGIR-1999 (Aug. 1999).
S. Alaoui-Mounir et al., *Fusion of Information Retrieval Engines (FIRE)*. Paper presented at the International Conference on Parallel and Distributed Processing Technologies and Applications (PDPTA-1998), Las Vegas, NV (1998).
S.E. Robertson et al., *Okapi at TREC-4*. Paper presented at the 4th Annual Text Retrieval Conference (TREC-4), NIST, Gaithersburg, MD (1995).
S.E. Robertson, *The Probability Ranking Principle in IR*. Journal of Documentation, 33(4), 294-301 (1977).
T. Negrino, "The MacWorld Web Searcher's Companion," MacWorld, PC World Communications, San Francisco, CA, US, vol. 17, No. 5, May 2000, pp. 76-82, XP008019722.
Tefko Saracevic et al., *A Study of Information Seeking and Retrieving, III. Searchers, Searches, and Overlap*. Journal of the American Society for Information Science, 39(3), 197-216 (1988).
W. John Wilbur, *The Knowledge in Multiple Human Relevance Judgments*. ACM Transactions on Information Systems, 16(2), 101-126 (1998).
Xiaolan Zhu et al., *Incorporating Quality Metrics in Centralized/Distributed Information Retrieval on the World Wide Web*, SIGIR-2000, Athens, Greece (Jul. 2000).

\* cited by examiner

700

& Buddy Info

Enter the screen name of the user you wish to get info about:

705 — User A

OK

Close

Warning Level: 0%
Online time: 6 hours, 34 minutes

Personal Profile:

715 — Full Name: Joe User
720 — Title: Chief Technical Officer
725 — Work Address: 1 Main Street, Washington, DC 20001
730 — Work Phone Number: 202-123-4567
735 — Fax Number: 202-765-4321

740 — Home Address: 1 Market Street, Washington, DC 20001
745 — Home Phone Number: 202-999-9999
750 — Cellular Phone Number: 202-888-8888
755 — Screen Name: User A 760 — Sexual Orientation: Heterosexual
765 — Interests: sports, art

710

Warning: Links may contain viruses or trojans.   Security Central

IM      Add Buddy      Directory Info

FIG. 7A

| | Sun 5 | Mon 6 | Tue 7 | Wed 8 | Thu 9 | Fri 10 | Sat 11 |
|---|---|---|---|---|---|---|---|
| 8 am | | | | | | | |
| 9am | | | | | ⊙ 9am-10:30am client demo —805 | | |
| 10am | ⊙ 10am-12pm breakfast with mom | —830 | | | | | |
| 11am | | ⊙ 11am-12pm performance evaluation —810 | | 🎁 11am-12pm design meeting | —815 | | |
| 12pm | | | | | ⊙ 12pm-1pm Conference Call | —820  835— | ⊙ 12pm-3pm son's soccer game |
| 1pm | | | | | | | |
| 2pm | | ✋ 2pm-4pm code review —825 | | | | | |
| 3pm | | | | | | | |
| 4pm | | | | | | ⊙ 4pm-5pm happy hour —840 | |
| 5pm | | | | | | | |
| 6pm | | | | ⊙ 6pm-8pm birthday dinner —845 | | | |
| 7pm | | | | | | | |

FIG. 8A

| | | | | | | | |
|---|---|---|---|---|---|---|---|
| Month | Week | Day | | | | | |
| | | ◀ October 5 – October 11, 2003 ▶ | | | Go To Today | Refresh | |
| | Sun 5 | Mon 6 | Tue 7 | Wed 8 | Thu 9 | Fri 10 | Sat 11 |
| ◇ | | | | | | | |
| 8 am | | | | | | | |
| 9am | | | | ⊙ 9am–10:30am client demo | —805 | | |
| 10am | | | | | | | |
| 11am | | ⊙ 11am–12pm performance evaluation —810 | | ⊞ 11am–12pm design meeting | —815 | | |
| 12pm | | | | | ⊙ 12pm–1pm Conference Call | —820 | |
| 1pm | | | | | | | |
| 2pm | | ✋ 2pm–4pm code review —825 | | | | | |
| 3pm | | | | | | | |
| 4pm | | | | | | | |
| 5pm | | | | | | | |
| 6pm | | | | | | | |
| 7pm | | | | | | | |

SOCIAL NETWORKING PERMISSIONS

CROSS REFERENCE TO RELATED APPLICATIONS

This application is a continuation-in-part of and claims the benefit of U.S. patent application Ser. No. 10/981,460, filed Nov. 5, 2004, and titled "Social Networking with Relationship Types," which claims the benefit of U.S. Provisional Application Ser. No. 60/552,718, filed Mar. 15, 2004, and titled "Social Networks," and U.S. Provisional Application Ser. No. 60/579,290, filed Jun. 15, 2004, and titled "Social Networking with Relationship Types." All three of the above applications are incorporated by reference in their entirety for all purposes.

This application is related to U.S. application Ser. No. 11/015,423, which was filed on Dec. 20, 2004, and is titled "Passively Populating a Participant List with Known Contacts," and to U.S. application Ser. No. 11/079,522, is concurrently filed herewith on Mar. 15, 2005, and is titled "Sharing Social Network Information." Both of the above applications are incorporated by reference in their entirety for all purposes.

TECHNICAL FIELD

This document relates to social networks.

BACKGROUND

Entities who may not have a direct relationship to one another may nevertheless be linked to one another through intermediary entities based on a personal, business, or other relationship among the entities and the intermediary entities. For example, a user A may have a friend, user B, who has a business relationship with user C. Thus, user A is linked to user C through user B. Such interpersonal interactions or relationships may generally be referred to as a social network. How many intermediary entities are needed to link one entity or user to another may generally be referred to as the degrees of separation between those two entities or users. In general, the relationship between user A and user B may be referred to as a direct relationship because there are no intermediate entities between the two. The relationship between user A and user C may be referred to as an indirect relationship because an intermediate entity connects the two.

SUMMARY

In one general aspect, enabling access to user-specific content includes maintaining data indicating a social network that indicates a first user and a second user that are connected by one or more relationships through zero or more intermediary users. At least one of the relationships that connect the first and second users is categorized. A request for access to content maintained by the second user is received from the first user. One or more of the relationships that connect the first user to the second user are identified using the data indicating the social network. A category of at least one of the identified relationships is identified. A type of access to the content to be provided to the first user is identified based on the identified category. The first user is enabled to access the content in accordance with the identified type of access.

Implementations may include one or more of the following features. For example, identifying a type of access to the content may include identifying, based on the identified category, that the first user is allowed to view the content, and enabling the first user to access the content may include enabling the first user to view the content. Identifying a type of access to the content may include identifying, based on the identified category, that the first user is allowed to modify the content, and enabling the first user to access the content may include enabling the first user to modify the content. Identifying a type of access to the content may include identifying, based on the identified category, that the first user is not allowed to access the content, and enabling the first user to access the content may include denying the first user access to the content. Identifying a type of access to the content may include identifying, based on the identified category, a portion of the content that the first user is allowed to access, and enabling the first user to access the content may include enabling the first user to access only the identified portion of the content.

The content may be a profile of the second user. Receiving a request for access to the content may include receiving a request for access to the profile. Identifying a type of access to the content may include identifying, based on the identified category, a portion of the profile that the first user is allowed to access, and enabling the first user to access the content may include enabling the first user to access the identified portion of the profile. Identifying a portion of the profile that the first user may access may include identifying one or more fields of the profile that have been designated as appropriate for users related to the first user with at least one relationship of the identified category. Enabling the first user to access the identified portion of the profile may include enabling the first user to access the identified fields of the profile.

The content may include at least one of the following: an electronic calendar of the second user, pictures maintained by the second user, annotations for pictures that are maintained by the second user, a list of entities for which presence information is monitored, an address book of the second user, an online data store of the second user, an online journal of the second user, or information describing an account of the second user.

The categories of the one or more relationships may include at least one of the following: friend, family member, business contact, vendor, or customer.

The identified category may represent a sub-category of a broader category. Identifying a type of access to the content based on the identified category may include identifying a type of access to the content based on the broader category.

Identifying one or more relationships may include identifying at least two relationships that connect the first user to the second user through at least one intermediary user. A composite category may be identified based on categories of the at least two identified relationships. Identifying a type of access to the content based on the identified category may include identifying a type of access to the content based on the composite category.

Identifying one or more relationships may include identifying at least two relationships that connect the first user to the second user through at least one intermediary user. Identifying a category of at least one of the identified relationships may include identifying categories of the at least two relationships. One of the identified categories for which a most restrictive type of access to the content may be provided to the first user may be identified. Identifying a type of access to the content may include identifying the most restrictive type of access to the content as the type of access to the content to be provided to the first user.

A characteristic of the first user may be identified. Identifying a type of access to the content may include identifying a type of access to the content based on the identified category and the identified characteristic. Identifying a characteristic of the first user may include identifying a degree of separation between the first user and the second user. Identifying a type of access to the content based on the identified category and on the identified characteristic may include identifying a type of access to the content based on the identified category and the identified degree of separation.

A request for access to the content maintained by the second user may be received from a third user that is not connected to the second user by one or more relationships through zero or more intermediary user. A type of access to the content to be provided to users that are not connected to the second user by one or more relationships through zero or more intermediary users may be identified, and the third user may be enabled to access the content in accordance with the identified type of access.

In another general aspect, enabling access to user-specific content includes receiving, from a first user, a request for access to content maintained by a second user. An indication of an allowable type of access based on a category of one or more relationships with which the first and second users are connected through zero or more intermediary users in a social network is requested. The indication of an allowable type of access is received, and the first user is enabled to access the content in accordance with the allowable type of access.

Implementations may include one or more of the following features. For example, receiving an indication of an allowable type of access may include receiving an indication of an allowable type of access based on a category of one or more relationships with which the first and second users are connected through zero or more intermediary users in a social network.

The content may include at least one of the following: a profile of the second user, an electronic calendar of the second user, pictures maintained by the second user, annotations for pictures that are maintained by the second user, a list of entities for which presence information is monitored, an address book of the second user, an online data store of the second user, an online journal of the second user, or information describing an account of the second user.

Receiving an indication of an allowable type of access may include receiving an indication that the first user is allowed to view the content, and enabling the first user to access the content may include enabling the first user to view the content. Receiving an indication of an allowable type of access may include receiving an indication that the first user is allowed to modify the content, and enabling the first user to access the content may include enabling the first user to modify the content. Receiving an indication of an allowable type of access may include receiving an indication that the first user is not allowed to access the content, and enabling the first user to access the content may include denying the first user access to the content. Receiving an indication of an allowable type of access may include receiving an indication of a portion of the content that the first user is allowed to access, and enabling the first user to access the content may include enabling the first user to access only the identified portion of the content.

These general and specific aspects may be implemented using a system, a method, or a computer program, or any combination of systems, methods, and computer programs.

Other features will be apparent from the description and drawings, and from the claims.

DESCRIPTION OF DRAWINGS

FIGS. 7A-7C are illustrations showing examples of interfaces for displaying a user profile to which differing types of access are provided based on categories of relationships in a social network.

FIGS. 8A-8C are illustrations showing examples of interfaces for displaying an electronic calendar to which differing types of access are provided based on categories of relationships in a social network.

DETAILED DESCRIPTION

Direct relationships within a social network may be categorized. For example, a direct relationship between a first user and a second user of the social network may be categorized as a family or business relationship. The type of access provided to a first user to content maintained by a second user may depend on the category of one or more direct relationships linking the two users. For example, a request from a first user for access to a calendar maintained by a second user may be granted or denied based on the category of one or more direct relationships linking the first and second users. More particularly, in one implementation, access to at least a portion of the calendar may be provided to the first user if the first user is related to the second user with a friend relationship, while access to the calendar may be denied if the first user is related to the second user with a business relationship. In another implementation, access by a first user to pictures, or annotations for the pictures, maintained by a second user may be conditioned upon the category of one or more relationship between the first user and the second user.

Allowing a user to condition access to content that is maintained by the user based on the categories of the relationships between the user and other users within a social network may facilitate the setting of access permissions for the content. Instead of having to manually indicate the permissions for each of the other users, the user may specify the permissions once for those other users that are related to the user with a particular category of relationship. The user may not be familiar enough with some of the other users to appropriately set permissions for those users, but specifying the permissions based on the categories eliminates the need of the user to be familiar with each of the other users. Instead, the user only needs to specify permissions for each type of user, as indicated by the categories of the relationships. Furthermore, default permissions for the other users may be specified automatically based on the categories, rather than for each of the other users individually.

Figure 1:
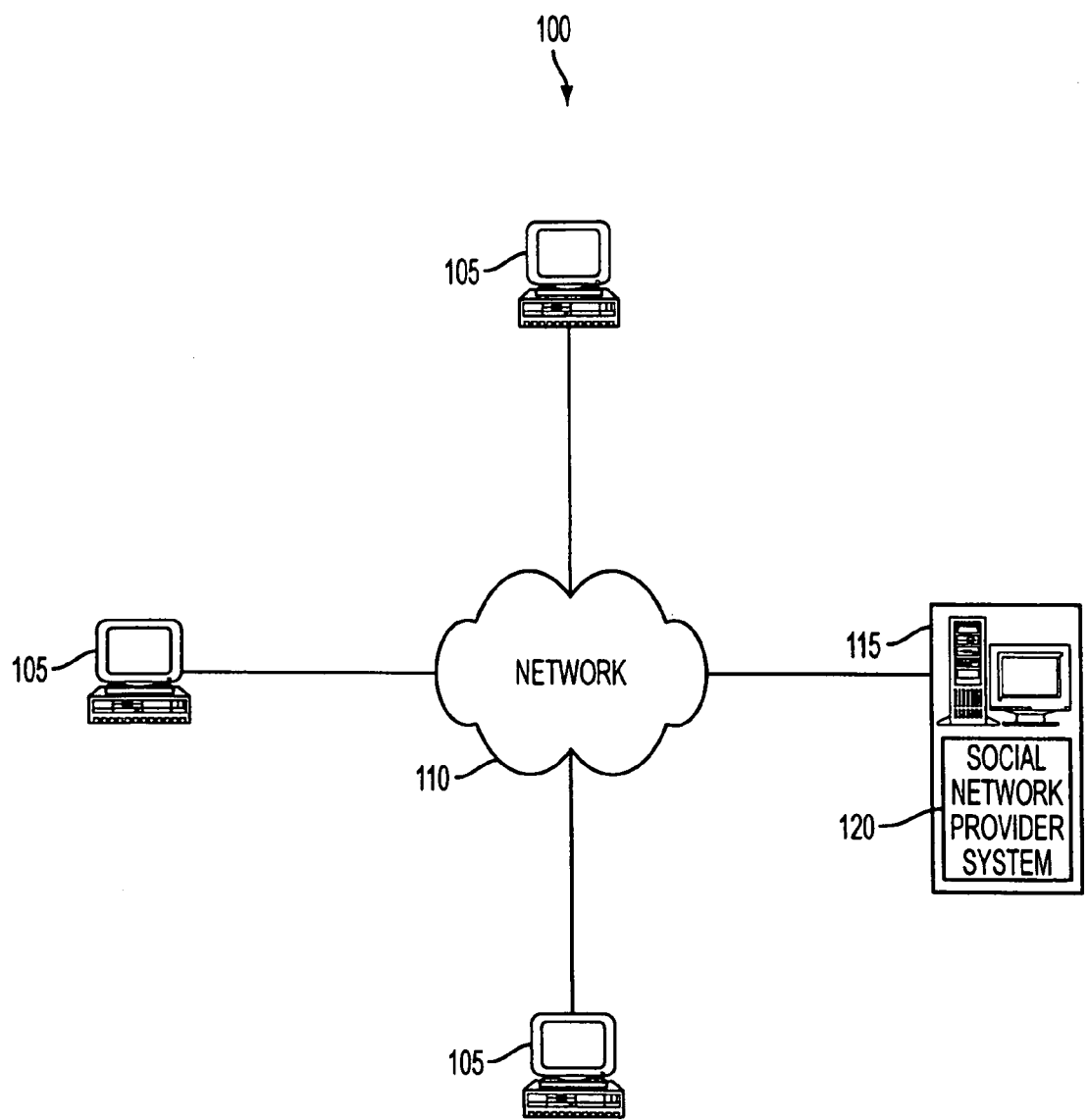
FIG. 1 is a block diagram of an example of a networked computing environment.

Referring to FIG. 1, an example of a networked computing environment 100 supports communications between computer users. The computer users may be members of a social network of users of the networked computer environment 100. The computer users are distributed geographically and communicate using client systems 105. A network 110 interconnects the client systems 105. The client systems 105 are connected to the network 110 through various communication channels, such as a modem connected to a telephone line (using, for example, serial line internet protocol (SLIP) or point-to-point protocol (PPP)) or a direct internetwork connection (using, for example, transmission control protocol/ internet protocol (TCP/IP)).

The client systems 105 include a communications interface (not shown) used by the communications programs to send communications through network 110. The communications may include for example, e-mail, audio data, video data, general binary data, or text data (e.g., encoded in American Standard Code for Information Interchange (ASCII) format). The client systems 105 also may include one or more input devices, such as a keyboard, a mouse, a stylus, a camera, or a microphone, as well as one or more output devices, such as a monitor, a touch screen, speakers, or a printer.

The network 110 typically includes a series of portals interconnected through a coherent system. Examples of the network 110 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. The network 110 may include multiple networks or subnetworks, each of which may include, for example, a wired or wireless data pathway.

A host server 115 also may be connected to the network 110 and may be used to facilitate some direct or indirect communications between the client systems 105. For example, the host server 115 may include a social network provider system 120 that maintains the social network of the users of the networked computing environment 100. To maintain the social network, the social network provider system 120 maintains lists of the users of the networked computing environment 100 and of the relationships between the users. In addition, the social network provider system 120 may indicate permissions to access content related to the users based on the relationships between the users. Furthermore, the social network provider system 120 may maintain information related to the users or the relationships between the users, such as profiles of the users or categories for the relationships. Alternatively or additionally, the social network provider system 120 may be configured to access the information related to the users from one or more external sources, such as another host server 115.

Each of the client systems 105 and the host server 115 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 105 and the host server 115 may receive instructions from, for example, a software application, a program, a piece of code, a device, a computer, a computer system, or a combination thereof, which independently or collectively direct operations, as described herein. These instructions may take the form of one or more communications programs that facilitate communications between the users of the client systems 105. For instance, such communications programs may include e-mail programs, instant messaging (IM) programs, file transfer protocol (FTP) programs, and voice over interne protocol (VoIP) programs. The instructions may be embodied permanently or temporarily in any type of machine, component, equipment, storage medium, or propagated signal that is capable of being delivered to the client systems 105 or the host server 115.

Further, the host server 115 includes a communications interface (not shown) used by the communications programs to send communications through network 110. The communications may include, for example, e-mail, audio data, video data, general binary data, or text data (e.g., encoded in American Standard Code for Information Interchange (ASCII) format).

Figure 2:
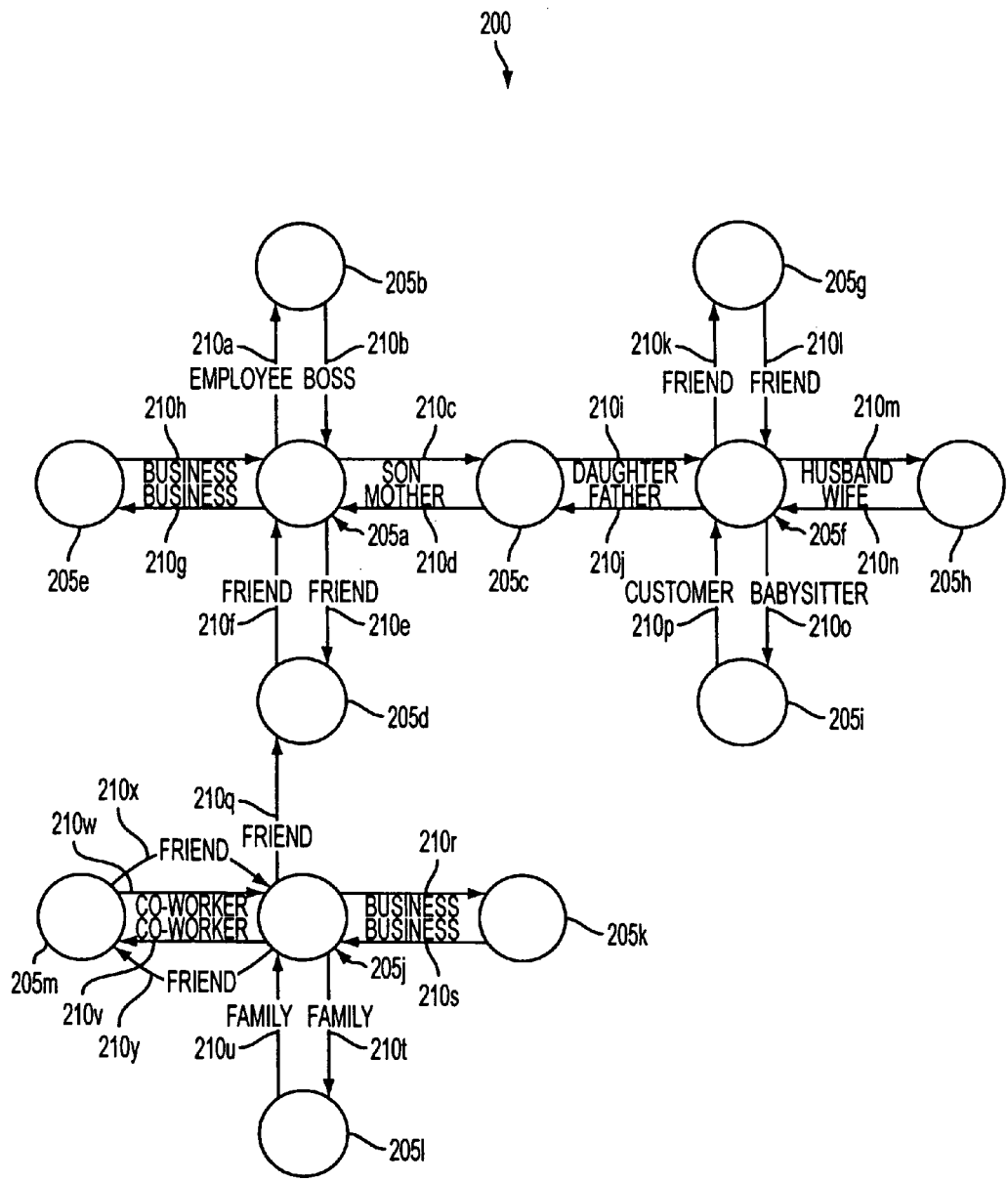
FIG. 2 is an illustration of an example of a social network with categorized relationships.

Referring to FIG. 2, an example of a social network map 200 indicates members 205a-205m of a social network that are linked through a series of relationships 210a-210y. In one implementation, the map 200 is a graphical representation of the members 205a-205m and the relationships 210a-210y, as is illustrated in FIG. 2. In another implementation, the map 200 represents data that is useful or sufficient in generating a graphical representation, such as that illustrated in FIG. 2, is a map.

The relationships 210a-210y define direct and indirect relationships between the members 205a-205m of the social network map 200. More particularly, the members 205a-205m that are connected by one of the relationships 210a-210y are involved in a direct relationship. For example, the members 205a and 205b are involved in a direct relationship, as evidenced by the relationships 210a and 210b that connect the members 205a and 205b.

In addition, the members 205a-205m that are connected indirectly through one or more intermediary members 205a-205m with more than one of the relationships 210a-210y are involved in indirect relationships. For example, the members 205c and 205d are involved in an indirect relationship because the members 205c and 205d are connected through the intermediary member 205a with the relationships 210c and 210f. The number of intermediary members through which two indirectly related members are related is called the degree of separation between the indirectly related members. In the above example, the members 205c and 205d are said to be one degree of separation apart because the member 205a is the only intermediary member through which the members 205c and 205d are related.

The relationships 210a-210y are unidirectional. In other words, each of the relationships 210a-210y relates an origin member to a destination member. For example, the member 205a is an origin member and the member 205b is a destination member of the relationship 210a.

Each of the relationships 210a-210y has a category. For example, the relationship 210a has a category of "employee." The categories of the relationships 210a-210y define the type of relationships of the corresponding destination members to the corresponding origin members. For example, the category of the relationship 210a indicates that the member 205b is an employee of the member 205a. As another example, the relationship 210b indicates that the member 205a is a boss of the member 205b. When a member is said to have a relationship of a particular category, the member is the destination member of the relationship with the particular category. In one implementation, the categories of the relationships may include at least one of the following: friend, family member, business contact, vendor, or customer.

The categories of the relationships 210a-210y may be identified from literal or constructive indications of the categories. A literal indication of a category for a direct relationship between two users is an indication of the category that is explicitly specified by one of the two users. For example, the category of the relationship 210w may be literally indicated if one of the members 205j and 205m explicitly indicates that they are co-workers.

Alternatively, a constructive indication of the category is an indication of the category that is generated based on information describing the two users, or the relationship between them. In other words, information describing the two users or the relationship may be used to infer a category for the relationship. For example, a communications strength between the two users, or another indication of the relationship between the two users, may constructively indicate the category between the first and second users. The communications strength between the first and second users may depend, for example, on the type of messages exchanged between the first and second users, the frequency of communication between the first and second users, a degree of separation between the first and second users, and/or other characteristics of the relationship between the first and second users. For example, the business relationship 210r may be inferred by the members 205j and 205k having a low communications strength, while the family relationship 210t may be inferred by the members 205j and 205l having a high communications strength. The concept of communications strength is more fully described in U.S. application Ser. No. 11/015,423, which was filed on Dec. 20, 2004, is titled "Passively Populating a Participant List with Known Contacts," and was previously incorporated herein in its entirety for all purposes.

In some implementations, a category may be indicated literally or constructively for a relationship that has not yet been established, in which case the relationship may be established with the indicated category. For example, the member 205b may explicitly designate in a contact list that the member 205g is a friend, in which case a friend relationship may be established between the members 205b and 205g in response to the designation. As another example, the member 205i and 205k may have a high communications strength, in which case a family relationship may be established between the members 205b and 205g.

Two of the members 205a-205m may be involved in multiple direct relationships with one another. For example, the members 205a and 205e are involved in the direct relationships 210g and 210h. The member 205a is the origin member of the relationship 210g, and the member 205e is the origin member of the relationship 210h. As another example, the members 205j and 205m are involved in the direct relationships 210v, 210w, 210x, and 210y. The member 205j is the origin member of the relationships 210v and 210y, and the member 205m is the origin member of the relationships 210w and 210x.

In some implementations, the direct relationships between two members have the same category. For example, the relationships 210k and 210l both have the same category, i.e. "friend," which indicates that the members 205f and 205g have been categorized as friends of one another. In other implementations, the multiple direct relationships have different categories. For example, the members 205f and 205i are involved in multiple direct relationships 210o and 210p that have different categories. The relationship 210o indicates that the member 205i is a babysitter of the member 205f, while the relationship 210p indicates that the member 205f is a customer of the member 205i. As another example, the relationships 210v, 210w, 210x, and 210y indicate that the members 205j and 205m are both friends and co-workers of one another.

The relationships 210a-210y may have more general or abstract interpretations than what is indicated by the corresponding categories. For example, the relationship 210c indicates that the member 205c is a son of the member 205a. The relationship 210c may be more generally interpreted to indicate that the member 205c is simply a member of a family of the member 205a. As another example, the relationship 210b indicates that the member 205a is the boss of the member 205b. The relationship 210b may be more abstractly or generally interpreted to indicate that the member 205a is a co-worker or a business contact of the member 205b. General categories, such as "family," "co-worker," or "business contact" may be explicitly defined for the relationships 210a-210y or inferred from specific categories assigned to the relationships 210a-210y, such as "brother" or "boss."

Specific social networks may be extracted from a general social network with categorized relationships, such as the social network illustrated by the social network map 200. More particularly, the categorized relationships may be used to identify whether two members of the general social network are included in a specific social network. More particularly, members of the general social network that are directly or indirectly related with a specific type of relationship may form a social network of the specific type. For example, the members 205j, 205k, and 205m may form a business social network because the members 205j, 205k, and 205m are directly and indirectly related with business type relationships. Alternatively, if two members of the general social network have a relationship of a specific type, all members of the general social network directly or indirectly related to the two members may form a social network of the specific type. For example, because the member 205a and 205d are related with a relationship that has a type of "friend," the members 205a-205m, who are directly or indirectly related to the members 205a and 205d, form a social network of friends.

Each of the members 205a-205m may maintain a personal profile that includes information describing the member, such as an employer, an occupation, favorite music, sexual orientation, or other personal or identifying information for the member. The members 205a-205m may present their profiles to one another while communicating. In one implementation, the members 205a-205m may present only particular aspects of their profiles to one another, depending on the relationships between the members 205a-205m. More particularly, the aspects of a profile of a first member that are presented to a second member that is directly related to the first member may depend on the type of the direct relationship between the first and second members. For example, only business-related aspects of a profile of the member 205a may be presented to the member 205e, because the members 205a and 205e are involved in the business relationship 210g. Alternatively or additionally, the aspects of a profile of a first member that are presented to a second member with whom the first member indirectly related may depend on the category or categories of the direct relationships between the members connecting the first member to the second member. For example, different aspects of a profile of the member 205m may be presented to the member 205d and the member 205k, because the members 205m and 205d are related by two friend relationships 210x and 210q while the members 205m and 205k are related by a friend relationship 210x and a business relationship 210r.

Similarly, the members 205a-205m may present different aspects of personal profiles to different specific social networks that relate the members 205a-205m. For example, the member 205m may present different aspects of a personal profile to different social networks, such as a friends network and a business network, that involve the member 205m. The aspects of the profile that are presented by the member 205m to a specific social network may depend on the relationship of the member 205m with one or more of the members of the specific social network. For example, the member 205m may present aspects of the profile appropriate for a social network of friends to a social network that includes the member 205d, because the member 205m is connected by friend relationships to the member 205d through the member 205j. If a first member is connected to a second member through differing types of relationships, then the first member may present an aspect of a personal profile that is appropriate for one of the types. For example, the member 205*j* may present aspects of a personal profile that are appropriate for a social network of friends to the member 205*m*. Alternatively, the member 205*j* may present aspects to the member 205*m* appropriate for a business network. Alternatively or additionally, the first member may present aspects of the personal profile that correspond to both of the differing types to the second member. For example, the member 205*j* may present aspects of a personal profile that are appropriate for a social network of friends and for a business social network to the member 205*m*.

Figure 3:
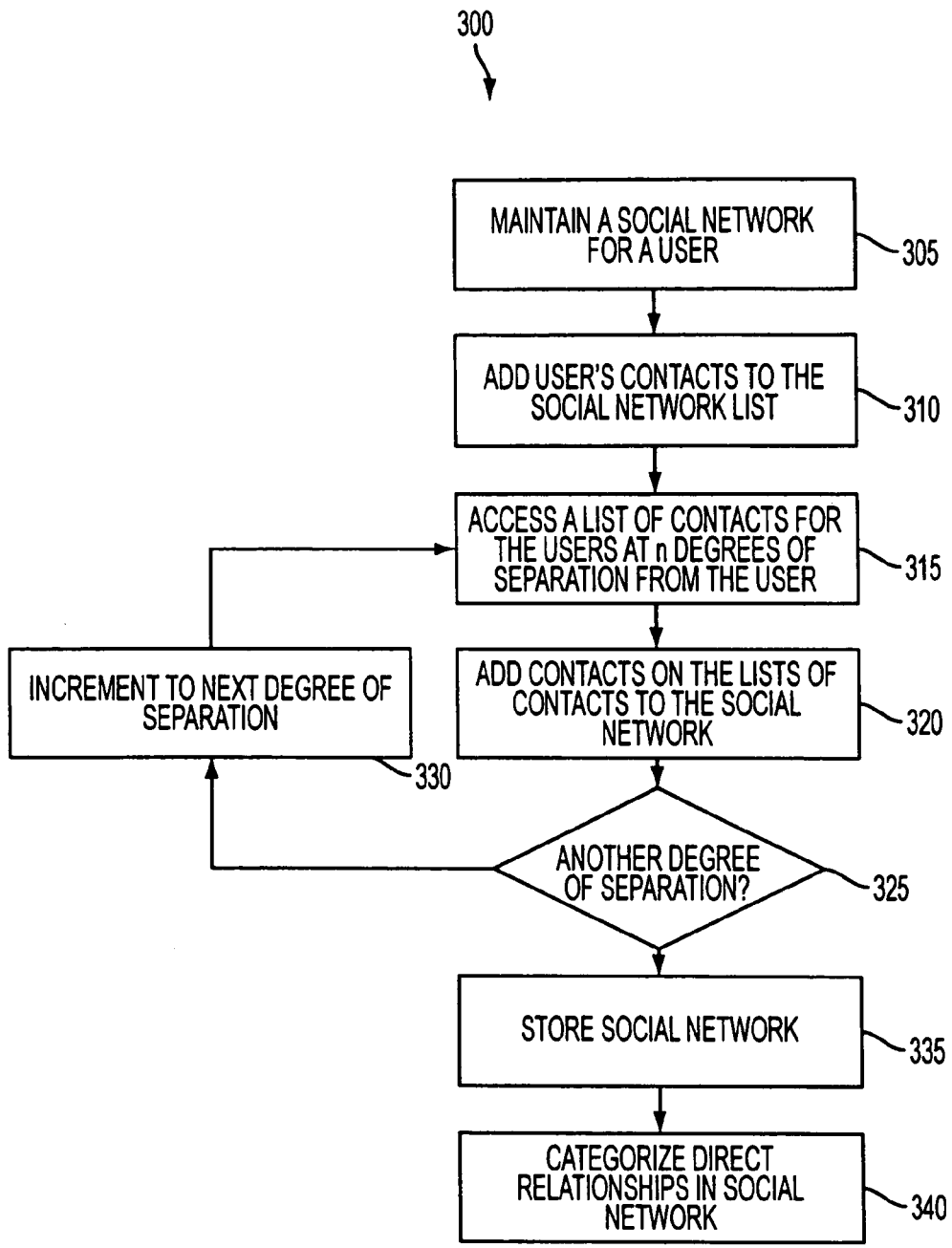
FIG. 3 is a flow chart of a process for establishing a social network with categorized relationships using contact lists of members of the social network.

Referring to FIG. 3, a process 300 may be used to establish and build a social network. The process 300 uses contact lists of members of the social network to add members to the social network and to establish relationships between the members of the social network. The process 300 may be executed by, for example the social network provider system 120 of FIG. 1. The process 300 begins with an initial user and adds to the social network contacts on contact lists of users within a certain number of degrees of separation from the initial user.

The process 300 includes maintaining a social network (305). Maintaining the social network may include maintaining the members of the social network and the categorized relationships between the members. Alternatively, a new social network may be established with the execution of the process 300, in which case, there is no set of members or relationships to maintain. The social network initially includes the initial user. If the initial user is not included in the social network, then the initial user is added to the social network.

A list of contacts is maintained for the initial user. The list of contacts may be any personally maintained list or lists, such as, for example, an address book, a contact list for instant messaging, and/or a white list. The rest of process 300 will be described using an address book as an example of a list of contacts. The contacts in the initial user's address book are added to the social network (310). Adding the contacts in the initial user's address book to the social network includes adding the contacts as members of the social network and establishing direct relationships between the initial user and the added contacts. The initial user is the origin member of the established relationships, and each of the added contacts is the destination member of one of the established relationships. In one implementation, a particular contact may be added to the social network, and a relationship may be established between the initial user and particular contact, only when the initial user and the particular contact list each other in their respective contact lists.

Next, the contacts linked to the initial user (i.e., up to a desired degree of separation) are identified and added to the social network. To do so, the address books of each contact in the initial user's address book are accessed (315). The contacts' address books typically include communication identifiers selected by the contacts. In one implementation, the contacts' address books are stored in a central location, such as on the host server 115 of FIG. 1. In another implementation, the address books are stored on local systems used by the contacts, such as the client systems 105 of FIG. 1.

The contacts in the user's contacts' address books (i.e., the contacts separated by one degree) then are added to the social network (320). Adding the contacts in the user's contacts' address books to the social network includes adding the contacts as members of the social network and establishing relationships between the added contacts and other members of the social network. More particularly, a direct relationship is established between one of the added contacts and the member of the social network whose address book includes the added contact. In such a case, the member of the social network whose address book includes the added contact is the origin member of the established relationship, and the added contact is the destination member of the established relationship.

One or more of the contacts in the user's contacts' address books already may be members of the social network. In such a case, the one or more contacts are not added to the social network, but relationships between the one or more contacts and the user's contacts are established. For example, the address book of a first contact that is listed in the address book of the initial user may list the initial user. The initial user is already a member of the social network, so the initial user does not need to be added to the social network. Therefore, a direct relationship with the first contact as the origin member and the initial user as the destination member may be established. A relationship with the initial user as the origin member and the first contact as the destination member was established when the first contact was added to the social network as a result of being included in the initial user's address book. Therefore, two direct relationships have been established between the initial user and the first contact.

The address books of the added contacts may be accessed to determine if the added contacts list any existing members of the social network in their address books. If so, then direct relationships may be established between the added contacts and the existing members of the social network. More particularly, if the address book of one of the added contacts lists one of the existing members of the social network, then a direct relationship with the added contact as the origin member and the existing member as the destination member is established.

If another degree of separation is desired (325), the degree of separation is incremented (330) such that the address books of the contacts that are separated from the user by one degree are accessed (315) and the contacts in those address books are added to the social network (320). The addition of contacts at larger degrees of separation from the initial user continues until the desired degree of separation is reached (325). Once the desired degree of separation has been reached, all of the contacts within that desired degree of separation from the user have been added to the social network, and the social network is stored (335).

The direct relationships between the members that have been added to the social network list are categorized (340). In one implementation, categories for the relationships are automatically inferred from the address books used to establish the direct relationships. More particularly, the groups within the address books may be used to set the categories for the direct relationships. For example, if a first member of the social network is added to the social network due to inclusion in a "friends" group of an address book of a second member, the direct relationship between the first member and the second member may be categorized as a "friend" relationship. In another implementation, a user may be enabled to categorize the direct relationships in the social network for which the user is the origin member. For example, if a first member is added to the social network due to inclusion in an address book for a second member, then the second member may be able to categorize the direct relationship between the first member and the second member for which the second member is the origin member.

The desired degrees of separation may be a system parameter or, in some implementations, the initial user may be provided with the ability to set the desired degrees of separation. For example, the initial user may be provided with an interface that allows the initial user to decide whether degrees of separation will be used, and, if so, how many degrees should be used. Alternatively, the desired degrees of separation may be both a system parameter and able to be set by the initial user. For example, the system may include a default degrees of separation, which can be adjusted by the initial user if he or she so desires.

The process 300 may result in the social network not being updated when any users update their contact lists. That is, if a user related to the initial user adds a contact to the user's contact list, the new contact may not be reflected in the social network. The process 300 may be repeated on a periodic or aperiodic basis to mitigate this situation. Another manner of mitigating this situation is to use an update system in which changes to contact lists are tracked and the social network is updated accordingly in an incremental fashion or by triggering an update or re-initiation of process 300 when a change occurs.

As an example, the process 300 may be used to create part of the social network map 200 of FIG. 2. More particularly, the process 300 may be used add the members of the social network map 200 within one degree of separation from an initial user, such as the member 205c. Contacts from an address book maintained by the member 205c are added to the social network map 200 (310). More particularly, the members 205a and 205f are added to the social network map 200 as a result of being included in the address book of the member 205c. Furthermore, the relationships 210d and 210i are established as a result of the members 205a and 205f being included in the address book of the member 205c. Address books for the members 205a and 205f are accessed because the members 205a and 205f are an initial number of degrees of separation from the member 205c (315), and contacts from the accessed address books are added to the social network map 200 (320). More particularly, the members 205b, 205d, 205e, 205g, 205h, and 205i are added to the social network map 200, and the corresponding relationships 210a, 210e, 210g, 210k, 210m, and 210o are established. The accessed address books also include the member 205c, which is already a member of the social network map 200. Consequently, the relationships 210c and 210j are established within the social network map 200, such that the member 205c is involved in two direct relationships with each of the members 205a and 205f.

At this point, contacts within one degree of separation from the member 205c have been added to the social network map 200. Address books of the members 205b, 205d, 205e, 205g, 205h, and 205i may be accessed to determine if the accessed address books include any existing members of the social network map 200. The address books maintained by the members 205b, 205d, and 205e each include the member 205a, so the relationships 210b, 210f, and 210h are established. Similarly, the address books maintained by the members 205g, 205h, and 205i each include the member 205f, so the relationships 210l, 210n, and 210p are established. Another degree of separation is not desired (325), so the social network map 200 is stored, (335), and the direct relationships that have been established are categorized (340). Other parts of the social network map 200 may be established through other related processes.

Figure 4:
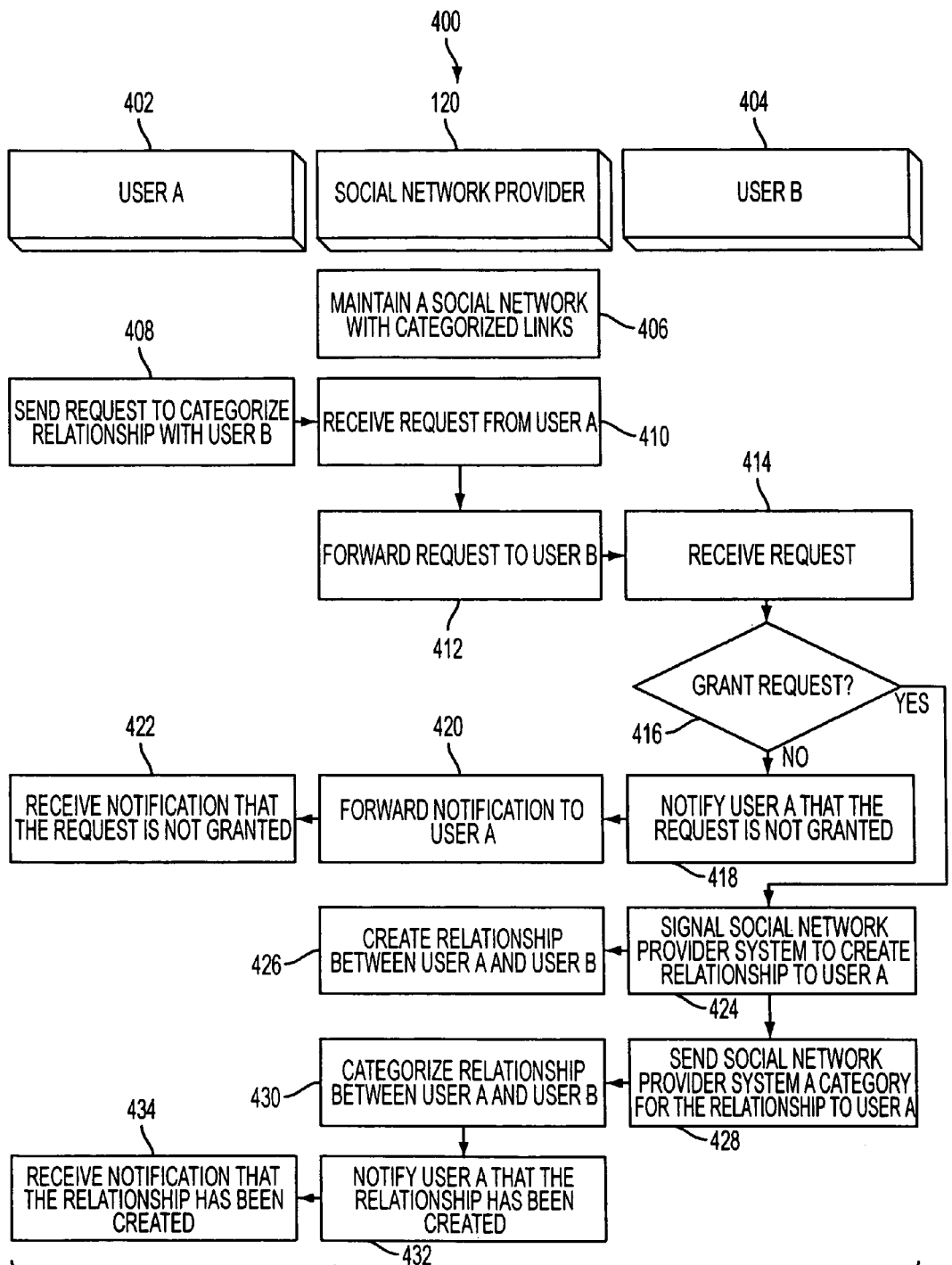
FIG. 4 is a communications diagram of a process for establishing and categorizing relationships in a social network

Referring to FIG. 4, an alternative or additional process 400 may be used to establish relationships within a social network based on an invitation-acceptance model. An invitation is sent between members to establish a relationship with the process 400. If the invitation is accepted, then the relationship is established. In one implementation of the process 400, a first user 402 uses the process 400 to request establishment of a relationship with a second user 404 though a social network provider system 120. The first user 402 and the second user 404 may be users of the client systems 105 of FIG. 1, and the social network provider system 120 may be the social network provider system 120 of FIG. 1. The first user 402 initially may not be a member of the social network and may become a member of the social network if the second user 404 accepts the invitation.

The social network provider 120 maintains a social network that includes the second user 404 (406). Maintaining the social network includes maintaining the members of the social network and the categorized relationships between the members. The members and the relationships maintained by the social network provider system 120 may be established using the process 300 of FIG. 3. Alternatively, the social network provider system 120 may be establishing a new social network with the execution of the process 400, in which case, the social network provider system 120 does not have a set of members or relationships to maintain. As another alternative, the social network may be established using an invitation-acceptance model similar to process 400.

The first user 402 sends an invitation to the second user 404 to establish a relationship between the first user 402 and the second user 404 (408). The invitation may be an e-mail message, an instant message, or some other message outlining the desire to establish a relationship with the second user 404. Alternatively or additionally, the invitation may be an interface displayed to the second user 404 that outlines the desire of the first user 402 to establish a relationship with the second user 404, and enables the second user 404 to accept or reject the invitation. The invitation is sent to the second user 404 through the social network provider system 120, so the social network provider system 120 receives the invitation from the first user 402 (410). The social network provider system 120 then forwards the invitation to the second user 404 (412). In implementations where the invitation is an interface to be displayed for the second user 404, sending the invitation to the second user 404 may include sending an indication that the interface should be displayed to the second user 404.

The second user 404 receives and views the invitation (414) and determines whether to accept the invitation (416). If the invitation is not accepted, then the second user 404 notifies the first user 402 that the invitation is not accepted (418). The notification may be an e-mail message, an instant message, or some other message indicating that the invitation is not accepted. For example, if the original invitation is an e-mail message, the notification may be a reply to the e-mail message. Alternatively or additionally, the notification may be an interface that is displayed to the first user 402 indicating that the invitation is not accepted. The notification is sent to the first user 402 through the social network provider system 120, so the social network provider system receives and forwards the notification to the first user 402 (420). In implementations where the notification is an interface to be displayed to the first user 402, sending the notification to the first user 402 may include sending an indication that the interface should be displayed to the first user 402. The first user 402 receives and views the notification that the invitation is not accepted (422), and a relationship is not established between the first user 402 and the customer.

If the second user 404 determines that the invitation is accepted (416), then the second user 404 signals the social network provider system 120 to establish a relationship between the first user 402 and the second user 404 (424). The social network provider system receives the signal and establishes a relationship between the first user 402 and the second user 404 (426). The relationship may be established such that the second user 404 is the origin member for the established relationship and the first user 402 is the destination member of the established relationship. Alternatively or additionally, the relationship may be established such that the first user 402 is the origin member for the established relationship and the second user 404 is the destination member for the established relationship.

In addition, a category for the established relationship is specified. In some implementations, the category is specified by the first user 402 in, for example, the original invitation sent to the second user 404. For example, the first user 402 may specify that the category of the relationship is "business," which would indicate that the first user 402 and the second user 404 are business contacts. The first user 402 may specify more specific categories for the established relationship, such as "boss" or "employee" instead of simply "business." In such implementations, the social network provider system 120 sets the category of the established relationship to what is indicated in the original invitation. In other implementations, the second user 404 specifies the category for the established relationship by sending a category for the established relationship to the social network provider system 120 (428). The social network provider system receives the category and sets the category of the established relationship to what is specified by the second user 404 (430).

After a category for the established relationship has been specified, the social network provider system 120 notifies the first user 402 that the relationship has been established and a category for the relationship has been set (432). The first user 402 receives the notification that the relationship has been established (434).

Figure 5:
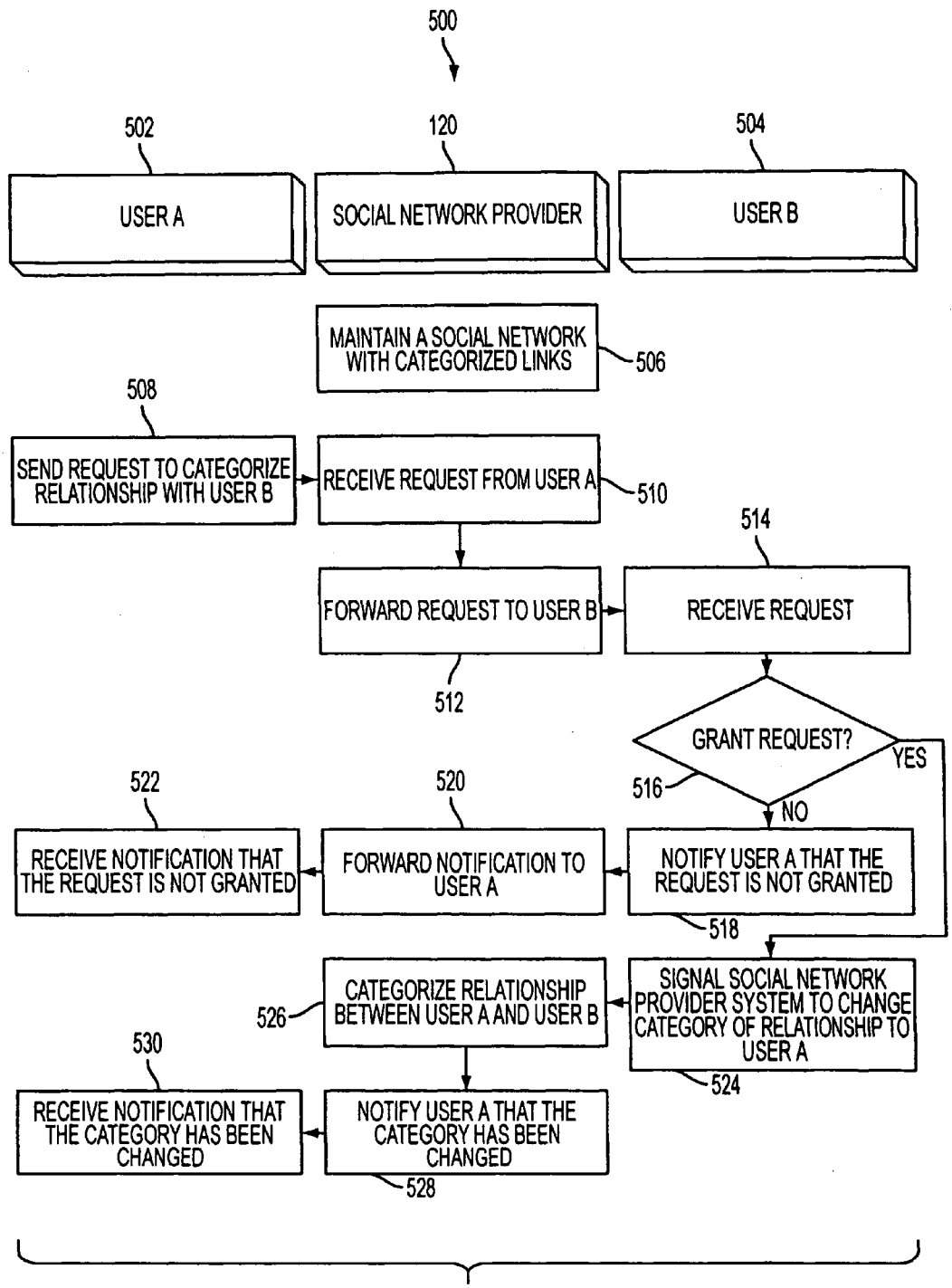
FIG. 5 is a communications diagram of a process for re-categorizing existing relationships in a social network.

Referring to FIG. 5, a process 500 may be used to categorize relationships within a social network based on an invitation-acceptance model. For example, the process 500 may be used to specify a category for an uncategorized relationship or to change a category of an already categorized relationship. An invitation is sent between the members to categorize a relationship with the process 500. If the invitation is accepted, then the relationship is categorized. In one implementation of the process 500, a first user 502 uses the process 500 to request that a relationship with a second user 504 be categorized through a social network provider system 120. The first user 502 and the second user 504 may be users of the client systems 105 of FIG. 1, and the social network provider system 120 may be the social network provider system 120 of FIG. 1.

The social network provider 120 maintains a social network that includes the first user 502 and the second user 504 (506). One or more direct relationships within the social network between the first user 502 and the second user 504 have been established.

The first user 502 may wish to establish or change the category of a relationship with the second user 504 for multiple reasons. For example, the first user 502 may be listed in an address book maintained by the second user 504 so that the second user 504 may contact the first user 502 when needed. The first user 502 may be added to the social network as a result of being included in the address book of the second user 504, and a relationship in the social network may be established between the first user 502 and the second user 504. However, the relationship may or may not be categorized, so the first user 502 may desire to change or to establish a category for the relationship.

To do so, the first user 502 sends an invitation to the second user 504 to categorize a relationship between the first user 502 and the second user 504 (508). The invitation to categorize the relationship may be an invitation to categorize an as yet uncategorized relationship or an invitation to change the category of an already categorized relationship. The invitation is sent to the second user 504 through the social network provider system 120, so the social network provider system 120 receives the invitation from the first user 502 (510).

The social network provider system 120 then forwards the invitation to the second user 504 (512). The second user 504 receives and views the invitation (514) and determines whether to accept the invitation to implicitly endorse the second user 504 (516). If the invitation is not accepted, then the second user 504 notifies the first user 502 that the invitation is not accepted (518). The notification is sent to the first user 502 through the social network provider system 120, so the social network provider system receives and forwards the notification to the first user 502 (520). The first user 502 receives and views the notification that the invitation is not accepted (522). If the relationship has not been categorized, then the relationship remains uncategorized. If the relationship has been categorized, then the category of the relationship remains unchanged.

If the second user 504 determines that the invitation is accepted (516), then the second user 504 signals the social network provider system 120 to categorize the relationship between the first user 502 and the second user 504 (524). The social network provider system receives the signal and categorizes the relationship between the first user 502 and the second user 504 (536). In some implementations, the category may be specified by the first user 502 in the original invitation to categorize the relationship sent to the second user 504. In such implementations, the social network provider system 120 sets the category of the relationship to what is indicated in the original invitation.

In other implementations, the second user 504 specifies the category for the established relationship by sending the category for the established relationship to the social network provider system 120. The social network provider system receives the specification of the category from the second user 504 and sets the category of the established relationship to what is specified by the second user 504. The social network provider system 120 notifies the first user 502 that the relationship has been categorized (528), and the first user 502 receives the notification that the relationship has been categorized (530).

Figure 6:
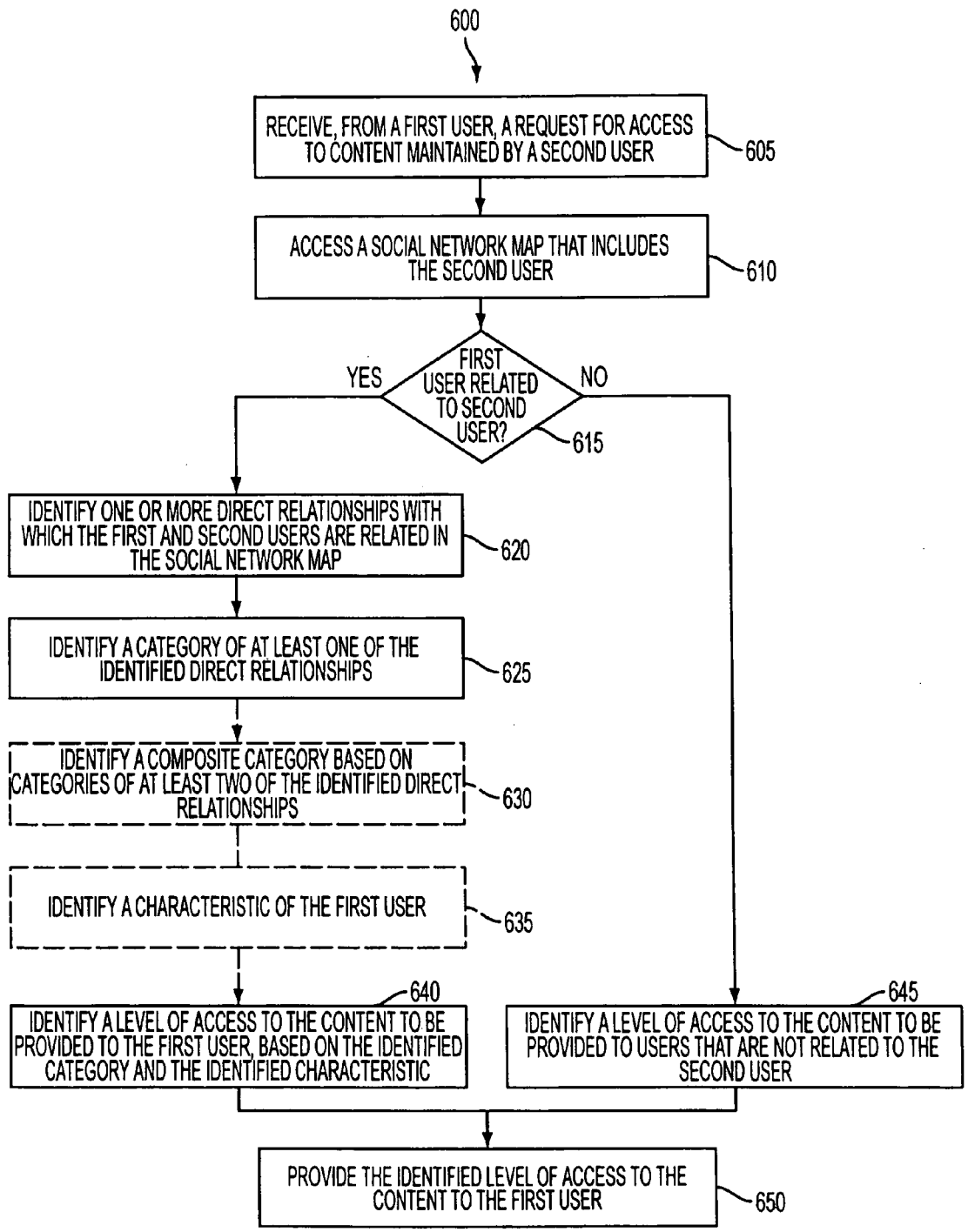
FIG. 6 is a flow chart of a process for providing access to content based on categories of relationships in a social network.

Referring to FIG. 6, a process 600 is used to provide a first user with access to content maintained by a second user based on the categories of the relationships connecting the first and second users in the social network. The process 600 may be executed by a social network provider system, such as the social network provider system 120 of FIG. 1.

The social network provider system receives, from a first user, a request for access to content maintained by a second user (605). The content may be, for example, a profile of the second user, an electronic calendar of the second user, pictures maintained by the second user, annotations for pictures that are maintained by the second user, a list of entities for which presence information is monitored, an address book of the second user, an online data store of the second user, an online journal of the second user, or information describing an account of the second user. When the content is a profile of the second user, the request may be for access to one or more fields included in the profile. The first user may request to view the content or modify the content. The first user also may request a portion of the content. The request may be received from a client system used by the first user, such as one of the client systems 105 of FIG. 1.

In one implementation, the first user may directly request the access to the content. For example, the first user may know an identifier of the second user within the social network, and the first user may use the identifier to request the profile of the second user. In another implementation, the first user may submit the request indirectly, such as, for example, in response to a search of the social network in which the second user was identified. More particularly, the first user may specify search criteria to find members of the social network matching the criteria. A set of search results that includes the second user may be presented to the first user, and the first user may select an indication of the second user, such as an identifier of the second user, from the set to request the content of the second user. The search criteria may include values of one or more fields included in a profile, and the second user may be identified as matching the search criteria because the fields of the second user's profile have the same values.

The social network provider system next accesses a social network map that includes the second user (610). For example, the social network provider system may access the social network map 200 of FIG. 2. The social network map indicates multiple members, including the second user, and direct relationships between pairs of the members. At least one pair of the multiple members is related within the social network map by one or more of the direct relationships through zero or more intermediary members. For example, the first user and the second user may be related by a single direct relationship without any intermediary members, in which case the first and second users may be said to be directly related. As another example, the first user and the second user may be related by at least two direct relationships through at least one intermediary member, in which case the first and second users may be said to be indirectly related. More particularly, the first and second users may be indirectly related through a third user (the intermediary member), in which case the direct relationships that connect the first user to the second user are the direct relationship between the first and third users, and the direct relationship between the second and third users. At least some of the direct relationships of the social network map are categorized. The members and the direct relationships of the accessed social network may be established and categorized using the process 300 of FIG. 3, the process 400 of FIG. 4, or the process 500 of FIG. 5.

The social network provider system determines whether the first user is related to the second user in the social network map (615). More particularly, the social network provider system may determine whether one or more direct relationships of the social network directly or indirectly relate the first user to the second user through zero or more intermediary members. For example, referring also to FIG. 2, the first user may be the member 205a, and the second user may be the member 205g. In such a case, the social network provider system determines that the first user is related to the second user, for example, through the relationships 210c, 210i, and 210k.

If the first user is related to the second user, the social network provider system identifies one or more direct relationships through which the first and second users are related (620). The first and second users may be related directly to one another in the accessed social network, in which case the social network identifies one or more of the direct relationships between the first and second users. For example, if the first user is the member 205m and the second user is the member 205j, the social network provider system identifies at least one of the relationship 210u-210x.

Alternatively, the first and second users may be related indirectly through at least one intermediary member. In one implementation, the social network provider system may identify direct relationships that relate the first user to the second user. For example, when the first and second users are related through a third user, a direct relationship from the first user to the third user and a direct relationship from the third user to the second user may be identified. More particularly, if the first user is the member 205a and the second user is the member 205f, the social network provider system may identify the relationships 210c and 210i. In another implementation, direct relationships that relate the second user to the first user may be identified. For example, when the first and second users are related through a third user, a direct relationship from the second user to the third user and a direct relationship from the third user to the first user may be identified. More particularly, using the above example, the social network provider system may identify the relationships 210j and 210d. In other implementations, the social network provider system may identify both the direct relationships that relate the first user to the second user and the direct relationships that relate the second user to the first user.

The social network provider system identifies a category of at least one of the identified direct relationships (625). In one implementation, the identified category may be a category of one of the identified direct relationships. For example, when the first and second users are directly related, the identified category may be a category of a relationship that directly relates the first and second users. More particularly, if the first user is the member 205f and the second user is the member 205h, the identified category may be the category of the relationship 210m, which is "husband," or the category of the relationship 210n, which is "wife." As another example, when the first and second users are indirectly related, the identified category may be a category of one of the direct relationships between the first and second users. More particularly, the identified category may be a category of a direct relationship for which the first or second user is the origin or destination member. For example, if the first user is the member 205e and the second user is the member 205h, the identified category may be the category of one of the relationships 210g, 210h, 210m, or 210n.

In other implementations, categories may be identified for at least two of the identified relationships, or for all of the identified relationships. In such implementations, the social network provider system may identify a composite category for the identified direct relationships based on the identified categories (630). The composite category represents a single category for the multiple direct relationships that relate the first and second users. For example, using the above example, the composite category for the multiple direct relationships between the member 205a and the member 205d may indicate that the member 205d is a daughter of a son of the member 205a, or that the member 205a is a mother of the father of the member 205d, depending on whether the relationships 210c and 210i or the relationships 210j and 210d were previously identified. In such a case, the composite category of the identified direct relationships may be "daughter of son" or "mother of father." Another example of a composite category may be "friend of a business contact," which describes the direct relationships between the members 205a and 205d.

Alternatively or additionally, the composite category may be identified as one of the identified categories for which a most restrictive type of access to the requested content may be provided to the first user. For example, more restrictive access may be provided to users related to the second user with a business relationship than with a friend relationship. If the first user is related to the second user with a friend relationship and a business relationship, the social network provider system may identify the business relationship as the composite category, because such a category may result in more restrictive access to the requested content for the first user. In other implementations, the social network provider system may select the least restrictive of the identified categories.

The social network provider system also may identify a characteristic of the first user (635). The identified characteristic may affect a type of access to the requested content that is provided to the first user. For example, the social network provider system may identify a degree of separation between the first and second users. Greater access to the requested content may be provided when the identified degree of separation is small, and more restrictive access may be provided when the identified degree of separation is large. For example, when the identified degree is within a first degree of separation, the first user may be able to modify the requested content. When the identified degree is greater than the first degree but less than a second degree of separation, the first user may be able to view the requested content. When the identified degree is greater than the second degree, the first user may be denied access to the content. Alternatively or additionally, an amount of the content to be provided to the first user may depend on the identified degree of separation.

The social network provider system identifies a type of access to the content to be provided to the first user, based on the identified category (640). The identified type of access also may depend on the identified characteristic of the first user. The identified category may represent a sub-category of a broader category. For example, the identified category may be "mother," "father," "sister," "brother," "son," or "daughter," which represent sub-categories of a broader "family" category. In such a case, the social network provider system may identify the type of access based on the broader category.

In one implementation, each possible category of a direct relationship may be associated with a type of access to the content. For example, users related to the second user with a family relationship may be able to modify the content, users related to the second user with a friend relationship may be able to view the content, and users related to the second user with a business relationship may be denied access to the content. As another example, users related to the second user with a family relationship may be able to view all of the content, users related to the second user with a friend relationship may be able to view a smaller portion of content, and users related to the second user with a business relationship may be able to view an even smaller portion of content.

Alternatively or additionally, one or more of the possible composite categories may be associated with a type of access to the content. For example, a family member of a friend of the second user may be able to modify the content, a friend of the friend of the second user may be able to view the content, and a business contact of the friend of the second user may be denied access to the content. As another example, a family member of a family member may be able to view all of the content, a friend of the family member may be able to view a portion of content that does not relate to professional aspects of the second user, and a business contact of the family member may be able to view a portion of content that does not relate to personal aspects of the second user.

The types of access corresponding to the possible categories and the possible composite categories may be specified by the second user. In one implementation, default types of access may be provided for each of the possible categories. The second user may be able to modify the defaults for one or more of the possible categories. In addition, the second user may be able to specify a type of access for a composite category, particularly if a default type of access for the composite category was not provided.

If the first user is not related to the second user (615), the social network provider system identifies a type of access to the content that is to be provided to users who are not related to the second user (645). In one implementation, the identified type of access is at least as restrictive as a most restrictive type of access that may be provided to the first user if the first user were related to the second user. For example, the requested access to the content may be categorically denied such that the first user may not view or modify any portion of the content.

The social network provider system provides the identified type of access to the content to the first user (650). The social network provider system may provide the portion of the content that the first user may access to the first user. In addition, the social network provider system may enable the first user to modify, or only to view, the content, as indicated by the identified type of access. Alternatively or additionally, the social network system may signal an external system that maintains the content to provide the identified type of access to the first user. In one implementation, the social network provider may authenticate an identity of the first user before providing the identified type of access to the content. For example, the first user may be required to sign into the social network provider system with a username and a password before being provided with the identified type of access.

As an example, the social network provider system may execute the process 600 to provide the member 205$i$ access to content maintained by the member 205$h$, such as a profile of the member 205$h$. The social network provider system receives such a request from the member 205$i$ (605). The social network provider system then accesses the social network map 200 (610). Based on the accessed map, the social network provider system determines that the member 205$i$ is related to the member 205$h$ through the member 205$f$ (615).

In more detail, the social network provider system may identify the relationships 210$p$ and 210$m$ as direct relationships that relate the members 205$i$ and 205$h$ (620). Categories of the relationships 210$p$ and 210$m$ are identified (625). The relationship 210$p$ indicates that the member 205$f$ is a customer of the member 210$i$, and the relationship 210$m$ indicates that the member 205$h$ is the husband of the member 205$f$. The customer relationship 210$p$ is a particular type of business relationship, and the husband relationship 210$m$ is a particular type of family relationship, and those broader categories may be used to identify a type of access to the profile to be provided to the member 205$i$.

The social network provider system may identify "family member of a business contact" as a composite category for the relationships between the members 205$i$ and 205$h$, based on the categories of the relationships 210$p$ and 210$m$ (630). Alternatively, the social network provider system may determine that the composite category is the category of the business relationship, since that category may indicate the most restrictive access to the profile. The social network provider system also may identify that the member 205$h$ is one degree of separation from the member 205$i$ (635). Using the identified categories, the corresponding composite category, and the identified degree of separation, the social network provider system may determine that the member 205$i$ is able to view professional aspects of the profile of the member 205$h$ (640). Such a determination may be made using default or user-specified types of access for categories of relationships or for composite categories. The social network provider system then provides the identified type of access to the profile of the member 205h to the member 205i (650).

Figure 7B:
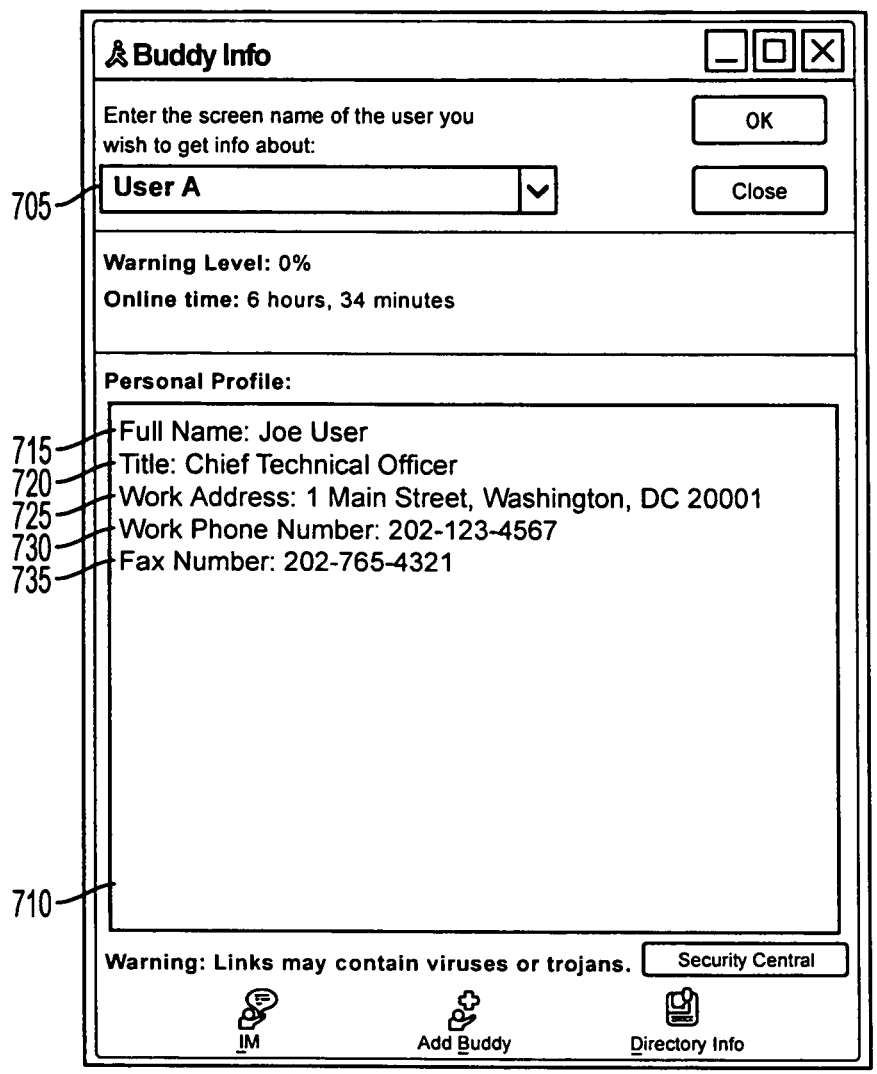
Figure 7C:
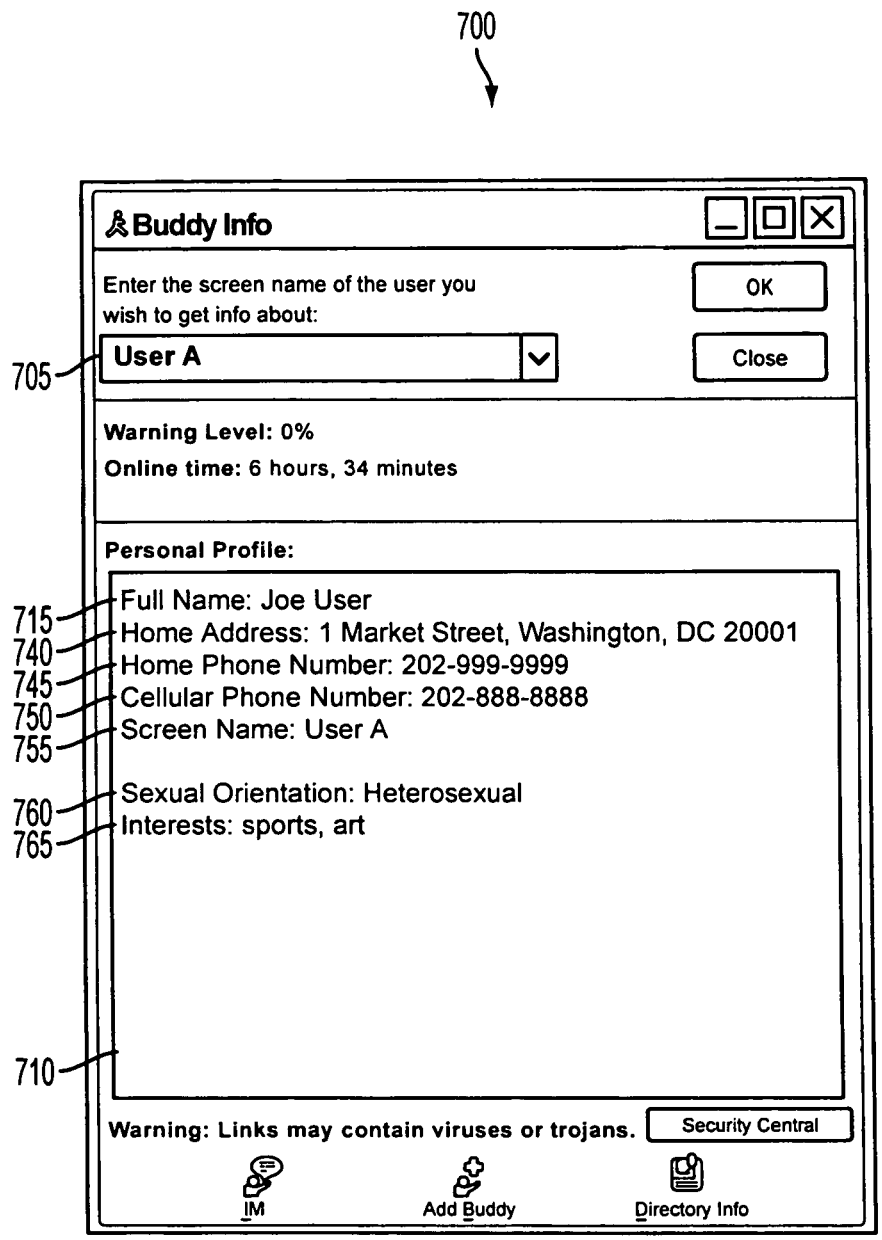
Figure 8C:
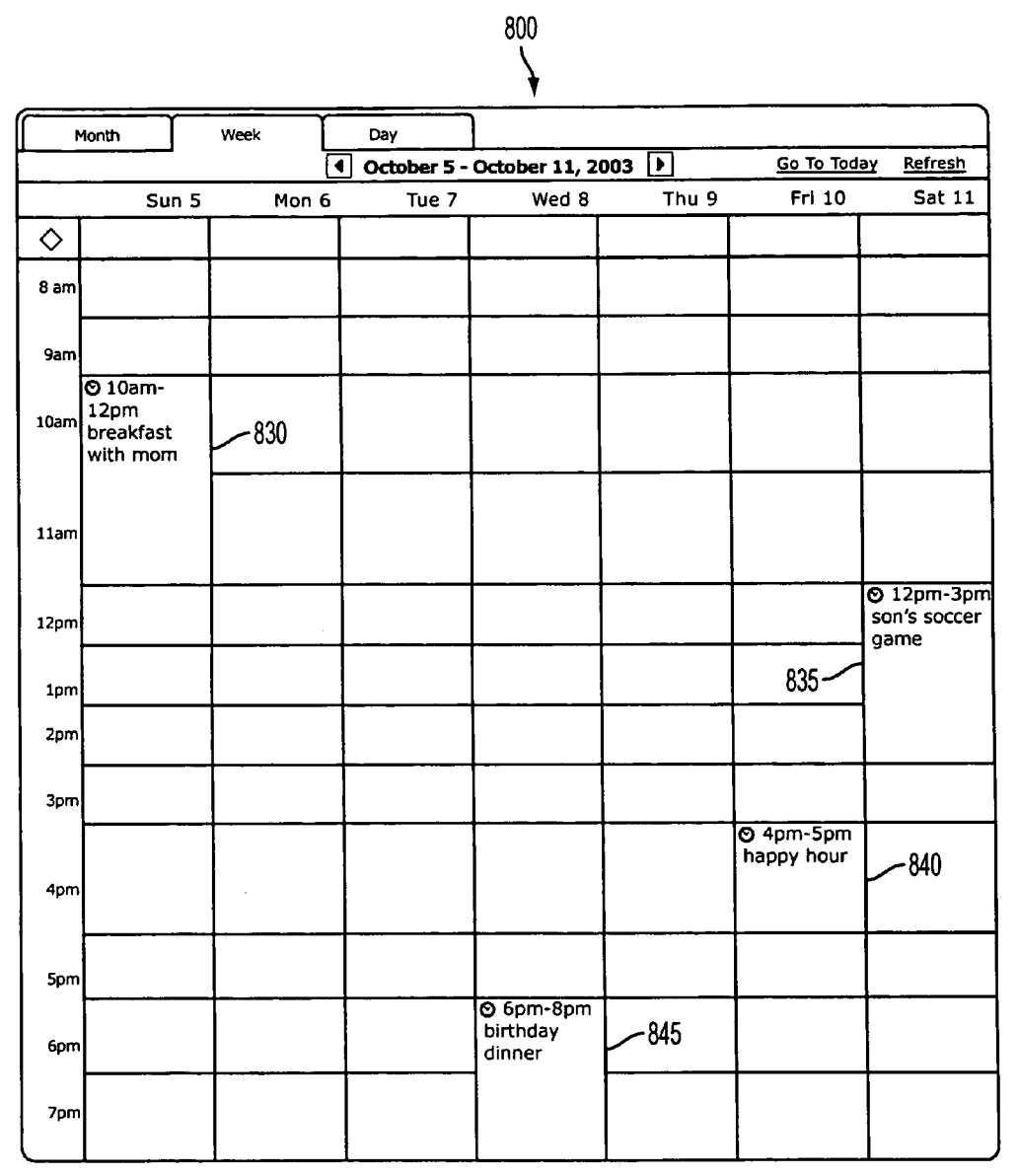

FIGS. 7A-7C and FIGS. 8A-8C illustrate interfaces that provide a first user with a particular type of access to content maintained by a second user, based on a category of relationship between the first and second users. More particularly, FIGS. 7A-7C illustrate an interface for limiting access to a profile of the second user, and FIGS. 8A-8C illustrate an interface for limiting access to an electronic calendar of the second user. In addition, access to other content that is maintained by the second user may be conditioned on a category of relationship between the first and second users.

For example, access to pictures, or annotations therefore, that are maintained by the second user, may be provided or limited based on the category of one or more relationships between the first and second users. More particularly, the second user may maintain a store of pictures that is accessible to other users, including the first user. The first user may be enabled to access all of the pictures when related to the second user with a family relationship. The first user may be enabled to access only some of the pictures when related to the second user with a friend relationship, and the first user may be denied access to all of the pictures when related to the second user with a business relationship.

The second user also may maintain several pictures in association with a profile of the second user, for example, for an online dating service. One of the pictures may be a conservative picture of the second user, and another one of the pictures may be a relaxed picture of the second user. The first user may be provided with access to the relaxed picture, or with access to both the relaxed picture and the conservative picture, when related to the second user with a close relationship, such as a friend relationship or a family relationship. Alternatively or additionally, the first user may be provided with access only to the conservative picture if the first user is related to the second user with a more distant relationship, such as a business relationship.

The pictures that are included in the store of pictures, or that are associated with the profile of the second user, may have associated annotations, such as captions or comments that are added by the second user or other users with the appropriate access to the pictures. Access to the annotations or portions of the annotations may be conditioned on the category of one or more relationships between the first and second users. For example, annotations associated with the pictures that the first user is able to access may be provided to the first user conditioned on whether the first user is related to the second user with a close friend or family relationship. The annotations or portions of the annotations may be withheld from the first user when the first user is related to the second user with a business relationship.

Referring to FIGS. 7A-7C, a profile interface 700 displays a profile of a second user to a first user that requests the profile. Different views of the profile may be displayed to the first user with the profile interface 700 based on whether the first user is related to the second user in a social network, and, if so, on categories of relationships with which the first and second users are related in the social network. The profile interface 700 includes an identifier field 705 that identifies the second user. A profile 710 of the second user includes fields 715-765 that include information describing the second user.

The identifier field 705 includes an identifier of the second user. For example, the identifier field 705 may include a screen name, e-mail address, or another identifier with which the second user may be identified within the social network.

In the illustrated example, the second user is identified by the screen name "User A" within the social network, as indicated by the identifier field 705.

The profile 710 includes information describing the second user. More particularly, each of the fields 715-765 includes a piece of information describing an aspect of the second user. For example, a name field 715 includes a full name of the second user, which is "Joe User." A title field 720 indicates that the second user is occupied as a chief technical officer. A work address field 725 and a work phone number field 730 indicate an address and a telephone number of a workplace of the second user. A fax number field 735 indicates a number of a fax machine used by the second user.

A home address field 740 and a home phone number field 745 indicate an address and a phone number of the second user's home, and a cell phone number field 750 indicates a phone number of the second user's cellular telephone. A screen name field 755, a sexual orientation field 760, and an interests field 765 indicate a screen name, a sexual orientation, and interests, respectively, of the second user.

A particular one of the profile interfaces 700 of FIGS. 7A-7C may be presented to the first user based on a relationship of the first user to the second user. The interface 700 of FIG. 7A provides the least restrictive access to the second user's profile 710, as indicated by the profile 710 including all of the fields 715-765. Therefore, the interface 700 of FIG. 7A may be presented to the users to which a large amount of information describing the second user is provided, such as family members of the second user. For example, if the second user is the member 205f in the social network map 200 of FIG. 2, the interface 700 may be presented to the member 205h, since the member 205h is related to the member 205f with family relationships 210m and 210n.

The interface 700 of FIG. 7B provides more restrictive access to the second user's profile 710, as indicated by the profile 710 only including the fields 715-735, which relate to professional aspects of the second user. Therefore, the interface 700 of FIG. 7B may be presented to users with whom the second user has a business relationship. For example, if the second user is the member 205c in the social network map 200, the interface 700 may be presented to the member 205e, since the member 205c is indirectly related to the member 205e with at least one business relationship 210g or 210h.

The interface 700 of FIG. 7C provides a different type of restricted access to the second user's profile 710, as indicated by the profile 710 only including the fields 715 and 740-765, which relate to personal aspects of the second user. Therefore, the interface 700 of FIG. 7C may be presented to users with whom the second user has a friend or family relationship. For example, if the second user is the member 205g in the social network map 200, the interface 700 may be presented to any other members of the social network 200, since the member 205g is directly or indirectly related to the other members with the friend relationships 210k and 210l.

In some implementations, none of the interfaces 700 of FIGS. 7A-7C may be presented to the first user, depending on a characteristic of the first user, such as a degree of separation between the first user and the second user. For example, one of the interfaces 700 may be presented to users that are within three degrees of separation from the second user. In this case, when the second user is the member 205m, a request for access to the profile of the member 205m that is received from one of the members 205f-205i will be denied, because the members 205f-205i are more than three degrees of separation from the member 205m. Therefore, one of the interfaces 700 will not be presented to the members 205f-205i.

Referring to FIGS. 8A-8C, an electronic calendar interface 800 displays an electronic calendar of a second user to a first user that requests access to the electronic calendar. Different views of the electronic calendar may be presented to the first user based on whether the first user is related to the second user in a social network, and, if so, on categories of relationships with which the first and second users are related in the social network.

The second user participates in events 805-845 that are displayed in the electronic calendar interface 800. The events 805-845 take place during a particular week displayed in the electronic calendar interface. Other implementations of the electronic calendar interface 800 may display events from a different time period, such as a particular day or a particular month. The events 805-845 represent two types of events. For example, the events 805-825 represent business events in which the user normally participates during business hours of the displayed week. In addition, the events 830-845 represent personal or social events in which the second user normally participates after business hours and on weekends.

A particular one of the electronic calendar interfaces 800 of FIGS. 8A-8C may be presented to the first user based on a relationship of the first user to the second user. The interface 800 of FIG. 8A provides the least restrictive access to the second user's electronic calendar, as indicated by the electronic calendar interface 800 displaying all of the events 805-845. Therefore, the interface 800 of FIG. 8A may be presented to the users to which a large amount of information describing events in which the second user participates is provided, such as family members of the second user. For example, if the second user is the member 205*l* in the social network 200 of FIG. 2, the interface 800 may be presented to the member 205*j*, since the member 205*j* is related to the member 205*l* with family relationships 210*m* and 210*n*.

The interface 800 of FIG. 8B provides more restrictive access to the second user's electronic calendar, as indicated by the electronic calendar interface 800 displaying the events 805-825, which relate to business events in which the second user participates. Therefore, the interface 800 of FIG. 8B may be presented to users with whom the second user has a business relationship. For example, if the second user is the member 205*i* in the social network 200, the interface 800 may be presented to the member 205*l*, since the member 205*i* is indirectly related to the member 205*l* with at least one business relationship 210*o* or 210*p*.

The interface 800 of FIG. 8C provides a different type of restricted access to the second user's electronic calendar, as indicated by the electronic calendar interface 800 displaying the events 830-845, which relate to personal or social events in which the user participates. Therefore, the interface 800 of FIG. 8C may be presented to users with whom the second user has a friend or family relationship, or to a friend of a family member of the user. For example, if the second user is the member 205*c* in the social network 200, the interface 800 may be presented to the member 205*g*, since the member 205*g* is a friend of a family member of the member 205*c*, as indicated by the relationships 210*i* and 210*k*.

A relationship of a member of a social network to a company, organization, or other entity may be indicated by relationships of the member to other members of the social network that are affiliated with, or otherwise correspond to, the company, organization, or other entity. For example, the member may have a relationship with the company if the member has a relationship with one or more of the members of the social network that correspond to the company. In some implementations, the member may have a relationship with the company if the member has a particular category of relationship with the one or more members. For example, the member may have a relationship with the company if the member has a "business" relationship with one or more members corresponding to the company. Determining that a member of a social network has a relationship to a company may include first identifying other members of the social network that are related to the member, and then determining which of the related members are employees of the company.

Alternatively, the member may have a relationship with the company if the member has a relationship with a member of the social network that abstractly represents the company. For example, a social network may include a member that is not a person, but rather a representation of a company. Other members of the social network may be related to the representation of the company in the social network with particular types of relationships to indicate the relationships between the other members and the actual company. For example, a first member may be related to the representation of the company with a "customer" relationship that indicates that the first member is a customer of the company, and a second member may be related to the representation with an "employee" link that indicates that the second member is an employee of the company. As a result, the described techniques may be used to provide or limit access to content that is maintained by a company, organization, or other entity. Furthermore, the described techniques may be used to provide or limit access to user-specific content to the company, organization, or entity.

The described techniques may be used to provide access to user-specific content to users of a social network. The described techniques also may be used to provide access to user-specific content to users that are part of different social networks or domains. For example, a first Internet service provider (ISP), such as the Microsoft Network, may provide a first social network, and a second ISP, such as America Online, may provide a second social network. The described techniques may be used, for example, to provide a first user included in the first social network with access to a profile of a second user included in the second social network.

In such a case, one or more members of the first social network also may be members of the second social network. The members included in both social networks may be required to register with both ISPs to be given identifiers to be used in each of the social networks. Registering a user with both of the social networks enables direct relationships to be established between the user and users of each of the social networks. In one implementation, registering a user with both social networks adds the user to both social networks. For each member that is included in both social networks, the first social network may include an indication of an identifier of the member within the second social network, and the second social network may include an indication of an identifier of the member within the first social network.

Each of the ISPs may maintain a dedicated social network provider system for the corresponding social network. When the first user requests access to the profile of the second user, a first social network provider system for the first social network may identify a third user of the first social network that is connected to the first user and that also is a member of the second social network. The first social network provider system may identify the third user by determining that the third user has an identifier within the second social network. The first social network provider system may provide the identifier of the third user within the second social network to a second social network provider system of the second social network. The first social network provider system also may provide an indication of one or more categories of direct relationships with which the first user is related to the third user in the first social network to the second social network provider system.

Using the received identifier of the third user, the second social network provider system may identify one or more direct relationships with which the third user is connected to the second user within the second social network. The second social network provider system may identify one or more categories of the identified direct relationships. Using the identified categories and the categories received from the first social network provider system, the second social network provider system may identify a type of access to the profile to be provided to the first user. The second social network provider system may communicate with the first social network provider system to provide the identified type of access to the profile to the first user. The first user may be required to be authenticated with the first or second social network provider system before being provided with the identified type of access. Such techniques are more fully described in U.S. application Ser. No. 11/079,522, is concurrently filed herewith on Mar. 15, 2005, is titled "Sharing Social Network Information," and was previously incorporated herein in its entirety for all purposes.

Various types of content have been described throughout, but the described techniques may be used to provide or limit access to any type of content. For example, the described techniques may be used to provide business contacts of a user access only to entries for business contacts from an address book of the user. Similarly, various types of relationships between users included in a social network have been described throughout. However, the described techniques may be used with other categories of relationships. In addition, various examples of types of access to user-specific content have been described throughout. However, the described types of access are included as examples only, and the described techniques may be used to provide other types of access to the content.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and, in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for enabling access to user-specific contact lists, comprising:
   receiving, from a first user, a request to access a contact list of a second user;
   obtaining information associated with a social network that includes the first and second users;
   identifying, based on the social networking information, at least one relationship connecting the first user to the second user;
   identifying a category associated with the at least one relationship;
   determining, using a processor, at least a portion of the contact list of the second user that is accessible to the first user based on at least the identified category, the accessible portion being a subset of the contact list of the second user; and
   enabling, using the processor, the first user to access the portion of the contact list of the second user.

2. The method of claim 1, wherein identifying the at least one relationship comprises identifying at least one direct relationship between the first and second users, the direct relationship connecting the first and second users through zero intermediary users.

3. The method of claim 2, wherein identifying the category comprises identifying the category associated with the at least one direct relationship based on the social networking information.

4. The method of claim 2, wherein identifying the at least one relationship comprises identifying a plurality of direct relationships that connect the first and second users.

5. The method of claim 4, further comprising:
   identifying categories associated with the plurality of direct relationships based on the social networking information; and
   determining a composite category representative of the identified categories,
   wherein the determining comprises determining the accessible portion of the contact list based on the composite category.

6. The method of claim 1, wherein identifying the at least one relationship comprises identifying at least one indirect relationship between the first and second users, the indirect relationship connecting the first and second users through one or more intermediary users.

7. The method of claim 6, further comprising computing, for the at least one indirect relationship, a degree of separation between the first and second users, wherein the determining comprises determining the accessible portion of the contact list of the second user based on at least the degree of separation between the first and second users.

8. The method of claim 1, wherein:
   the request comprises information identifying the first user;

the method further comprises identifying at least one characteristic of the first user based on the information; and
the determining comprises the accessible portion of the contact list of the second user based on at least the first user characteristic.

9. The method of claim 1, further comprising determining a type of access associated with the accessible portion of the contact list of the second user based on at least the identified category, the enabling comprises enabling the first user to access the portion of the contact list in accordance with the access type.

10. The method of claim 1, further comprising:
determining, based on the social networking information, that no relationship connects the first and second users; and
assigning a default type of access to the contact list of the second user, based on the determination that no relationship connects the first and second users,
wherein the enabling comprises enabling the first user to access the contact list of the second user in accordance with the default access type.

11. The method of claim 1, wherein the identified category comprises at least one of a friend, a family member, a business contact, a vendor, or a customer.

12. An apparatus, comprising:
a storage device that stores a set of instructions; and
at least one processor coupled to the storage device and executing the set of instructions, the set of instructions configuring the at least one processor to:
receive, from a first user, a request to access a contact list of a second user;
obtain information associated with a social network that includes the first and second users;
identify, based on the social networking information, at least one relationship connecting the first user to the second user;
identify a category associated with the at least one relationship;
determine at least a portion of the contact list of the second user that is accessible to the first user based on at least the identified category, the determined contact list portion being a subset of the contact list of the second user; and
enable the first user to access the portion of the contact list of the second user.

13. The apparatus of claim 11, wherein the processor is further configured to identify at least one direct relationship between the first and second users, the direct relationship connecting the first and second users through zero intermediary users.

14. The apparatus of claim 13, wherein the processor is further configured to identify the category associated with the at least one direct relationship, based on the social networking information.

15. The apparatus of claim 13, wherein the processor is further configured to identify a plurality of direct relationships that connect the first and second users.

16. The apparatus of claim 15, wherein the processor is further configured to:
identify categories associated with the plurality of direct relationships based on at least the social networking information;
determine a composite category representative of the identified categories; and
determine the accessible portion of the contact list of the second user based on the composite category.

17. The apparatus of claim 12, wherein the processor is further configured to:
identify at least one indirect relationship between the first and second users, the indirect relationship connecting the first and second users through one or more intermediary users;
compute, for the at least one indirect relationship, a degree of separation between the first and second users; and
determine the accessible portion of the contact list of the second user, based on at least the degree of separation between the first and second users.

18. The apparatus of claim 12, wherein:
the request comprises information identifying the first user; and
the processor is further configured to:
identify at least one characteristic of the first user based on the information; and
determine the accessible portion of the contact list of the second user based on at least the first user characteristic.

19. The apparatus of claim 12, wherein the processor is further configured to:
determine, based on the identified category, a type of access associated with the accessible portion of the contact list of the second user; and
enable the first user to access the portion of the contact list of the second user in accordance with the access type.

20. The apparatus of claim 12, wherein the processor is further configured to:
determining, based on the social networking information, that no relationship connects the first and second users; and
assigning a default type of access to the contact list of the second user, based on the determination that no relationship connects the first and second users,
wherein the enabling comprises enabling the first user to access the contact list of the second user in accordance with the default access type.

21. The apparatus of claim 12, wherein the identified category comprises at least one of a friend, a family member, a business contact, a vendor, or a customer.

22. A tangible, non-transitory computer-readable medium storing instructions that, when executed by at least one processor, cause the at least one processor to perform a method for enabling access to user-specific contact lists, comprising:
receiving, from a first user, a request to access a contact list of a second user;
obtaining information associated with a social network that includes the first and second users;
identifying, based on the social networking information, at least one relationship connecting the first user to the second user;
identifying a category associated with the at least one relationship;
determining, using a processor, at least a portion of the contact list of the second user that is accessible to the first user based on at least the identified category, the accessible portion being a subset of the contact list of the second user; and
enabling the first user to access the portion of the contact list of the second user.

* * * * *